(12) United States Patent
Spink et al.

(10) Patent No.: US 8,192,889 B2
(45) Date of Patent: Jun. 5, 2012

(54) PROTON EXCHANGE MEMBRANE FUEL CELL STACK AND FUEL CELL STACK MODULE

(75) Inventors: Scott A. Spink, Spokane, WA (US); David R. Lott, Spokane, WA (US); Matthew M. Wright, Spokane, WA (US); Eric J. Ryan, Spokane, WA (US); Dinesh S. Yemul, Liberty Lake, WA (US); John M. Fisher, Spokane, WA (US)

(73) Assignee: ReliOn, Inc., Spokane, WA (US)

( * ) Notice: Subject to any disclaimer, the term of this patent is extended or adjusted under 35 U.S.C. 154(b) by 0 days.

(21) Appl. No.: 13/210,265

(22) Filed: Aug. 15, 2011

(65) Prior Publication Data
US 2011/0300467 A1 Dec. 8, 2011

Related U.S. Application Data

(63) Continuation of application No. 11/800,994, filed on May 8, 2007, now Pat. No. 8,026,020.

(51) Int. Cl.
H01M 8/24 (2006.01)
(52) U.S. Cl. ........................................ 429/465
(58) Field of Classification Search ............... 29/623.1; 429/480, 457, 514, 535, 465, 483
See application file for complete search history.

(56) References Cited

U.S. PATENT DOCUMENTS

| | | |
|---|---|---|
| 3,061,658 A | 10/1962 | Blackmer |
| 3,297,487 A | 10/1964 | Pomeroy et al. |
| 3,183,123 A | 5/1965 | Haworth |
| 3,346,421 A | 10/1967 | Thompson et al. |
| 3,380,856 A | 4/1968 | Pohl |
| 3,645,796 A | 2/1972 | Bohm et al. |
| 4,017,426 A | 4/1977 | Carbonnel et al. |
| 4,076,899 A | 2/1978 | Kring |
| 4,243,508 A | 1/1981 | Dankese |
| 4,252,868 A | 2/1981 | Bohm et al. |
| 4,324,636 A | 4/1982 | Dankese |
| 4,324,844 A | 4/1982 | Kothman |
| 4,444,851 A | 4/1984 | Maru |
| 4,508,793 A | 4/1985 | Kumata et al. |
| H16 H | 1/1986 | Kaun |
| 4,746,363 A | 5/1988 | DeAngelis |
| 4,982,309 A | 1/1991 | Shepherd |
| 4,983,472 A | 1/1991 | Katz et al. |
| 5,053,294 A | 10/1991 | Sernka et al. |

(Continued)

FOREIGN PATENT DOCUMENTS
EP 1498971 1/2005
(Continued)

OTHER PUBLICATIONS

Chinese Patent Application 200880015047.8; Office Action dated Jan. 13, 2012; 1 page.

*Primary Examiner* — Jennifer Michener
*Assistant Examiner* — Monique Wills

(57) ABSTRACT

A proton exchange membrane fuel cell stack and novel proton exchange membrane fuel cell module are disclosed and wherein the proton exchange membrane fuel cell stack includes a plurality of repeating, serially electrically coupled fuel cell stack modules, and which are sealably mounted together by a compressive force of less than about 60 pounds per square inch.

1 Claim, 22 Drawing Sheets

U.S. PATENT DOCUMENTS

| | | |
|---|---|---|
| 5,069,985 A | 12/1991 | Cohen et al. |
| 5,094,928 A | 3/1992 | Dyer |
| 5,117,482 A | 5/1992 | Hauber |
| 5,132,193 A | 7/1992 | Reddy et al. |
| 5,187,025 A | 2/1993 | Kelland et al. |
| 5,232,792 A | 8/1993 | Reznikov |
| 5,242,764 A | 9/1993 | Dhar |
| 5,252,410 A | 10/1993 | Wilkinson et al. |
| 5,273,837 A | 12/1993 | Aitken et al. |
| 5,286,579 A | 2/1994 | Akagi |
| 5,292,600 A | 3/1994 | Kaufman |
| 5,364,711 A | 11/1994 | Yamada et al. |
| 5,419,980 A | 5/1995 | Okamoto et al. |
| 5,462,815 A | 10/1995 | Horiuchi |
| 5,470,671 A | 11/1995 | Fletcher et al. |
| 5,470,672 A | 11/1995 | Naoumidis |
| 5,482,792 A | 1/1996 | Faita et al. |
| 5,484,666 A | 1/1996 | Gibb et al. |
| 5,486,430 A | 1/1996 | Gorbell et al. |
| 5,514,487 A | 5/1996 | Washington et al. |
| 5,534,362 A | 7/1996 | Okamoto et al. |
| 5,543,239 A | 8/1996 | Virkar et al. |
| 5,543,240 A | 8/1996 | Lee et al. |
| 5,547,776 A | 8/1996 | Fletcher et al. |
| 5,547,777 A | 8/1996 | Richards |
| 5,565,072 A | 10/1996 | Faita et al. |
| 5,578,388 A | 11/1996 | Faita et al. |
| 5,624,769 A | 4/1997 | Li et al. |
| 5,629,104 A | 5/1997 | Crawford, Sr. et al. |
| 5,686,200 A | 11/1997 | Barton et al. |
| 5,736,269 A | 4/1998 | Okamoto et al. |
| 5,747,185 A | 5/1998 | Hsu |
| 5,750,281 A | 5/1998 | Washington et al. |
| 5,789,091 A | 8/1998 | Wozniczka et al. |
| 5,798,187 A | 8/1998 | Wilson et al. |
| 5,827,602 A | 10/1998 | Koch et al. |
| 5,863,671 A | 1/1999 | Spear, Jr. et al. |
| 5,879,826 A | 3/1999 | Lehman et al. |
| 5,925,039 A | 7/1999 | Landingham |
| 5,964,991 A | 10/1999 | Kawasaki et al. |
| 5,972,530 A | 10/1999 | Shelekhin et al. |
| 5,993,987 A | 11/1999 | Wozniczka et al. |
| 6,001,502 A | 12/1999 | Walsh |
| 6,022,634 A | 2/2000 | Ramunni et al. |
| 6,024,848 A | 2/2000 | Dufner et al. |
| 6,025,457 A | 2/2000 | Ohno et al. |
| 6,030,718 A | 2/2000 | Fuglevand et al. |
| 6,037,072 A | 3/2000 | Wilson et al. |
| 6,037,073 A | 3/2000 | Besmann et al. |
| 6,040,072 A | 3/2000 | Murphy et al. |
| 6,040,076 A | 3/2000 | Reeder |
| 6,042,955 A | 3/2000 | Okamoto |
| 6,042,959 A | 3/2000 | Debe et al. |
| 6,066,409 A | 5/2000 | Ronne et al. |
| 6,110,612 A | 8/2000 | Walsh |
| 6,117,287 A | 9/2000 | Molter et al. |
| 6,124,051 A | 9/2000 | Johnson |
| 6,143,675 A | 11/2000 | McCollam et al. |
| 6,146,780 A | 11/2000 | Cisar et al. |
| 6,146,781 A | 11/2000 | Surampudi et al. |
| 6,171,720 B1 | 1/2001 | Besmann et al. |
| 6,174,616 B1 | 1/2001 | Marvin et al. |
| 6,180,274 B1 | 1/2001 | Yoshimoto et al. |
| 6,183,896 B1 | 2/2001 | Horita et al. |
| 6,194,095 B1 | 2/2001 | Hockaday |
| 6,207,310 B1 | 3/2001 | Wilson et al. |
| 6,218,039 B1 | 4/2001 | Mease et al. |
| 6,235,168 B1 | 5/2001 | Strutt et al. |
| 6,248,469 B1 | 6/2001 | Formato et al. |
| RE37,284 E | 7/2001 | Li et al. |
| 6,280,870 B1 | 8/2001 | Eisman et al. |
| 6,280,883 B1 | 8/2001 | Lamanna et al. |
| 6,297,185 B1 | 10/2001 | Thompson et al. |
| 6,322,919 B1 | 11/2001 | Yang et al. |
| 6,358,641 B1 | 3/2002 | Mease |
| 6,372,376 B1 | 4/2002 | Fronk et al. |
| 6,403,245 B1 | 6/2002 | Hunt |
| 6,425,993 B1 | 7/2002 | Debe et al. |
| 6,468,682 B1 | 10/2002 | Fuglevand et al. |
| 6,492,047 B1 | 12/2002 | Peled et al. |
| 6,497,975 B2 | 12/2002 | Bostaph et al. |
| 6,503,654 B2 | 1/2003 | Marchetti |
| 6,524,452 B1 | 2/2003 | Clark et al. |
| 6,531,238 B1 | 3/2003 | King |
| 6,531,241 B1 | 3/2003 | McEwen |
| 6,544,679 B1 | 4/2003 | Petillo et al. |
| 6,602,631 B1 | 8/2003 | Cisar et al. |
| 6,613,468 B2 | 9/2003 | Simpkins et al. |
| 6,638,657 B1 | 10/2003 | Cisar et al. |
| 6,649,031 B1 | 11/2003 | Iqbal et al. |
| 6,653,009 B2 | 11/2003 | Wang et al. |
| 6,663,992 B2 | 12/2003 | Lehnert et al. |
| 6,703,155 B2 | 3/2004 | Scartozzi |
| 6,716,549 B2 | 4/2004 | Bai et al. |
| 6,720,105 B2 | 4/2004 | Ohlsen et al. |
| 6,733,913 B2 | 5/2004 | Cisar et al. |
| 6,740,443 B2 | 5/2004 | Yamazaki et al. |
| 6,761,990 B1 | 7/2004 | Yoshitake et al. |
| 6,770,394 B2 | 8/2004 | Appleby et al. |
| 6,805,990 B2 | 10/2004 | Gorbell |
| 6,828,057 B2 | 12/2004 | Ovshinsky et al. |
| 6,828,062 B2 | 12/2004 | Lu et al. |
| 6,838,202 B2 | 1/2005 | Brady et al. |
| 6,838,205 B2 | 1/2005 | Cisar et al. |
| 6,844,101 B2 | 1/2005 | Lee et al. |
| 6,852,437 B2 | 2/2005 | Cisar et al. |
| 6,855,450 B2 | 2/2005 | Molter et al. |
| 6,863,838 B2 | 3/2005 | Hamrock |
| 6,869,720 B2 | 3/2005 | Anderson et al. |
| 6,872,487 B2 | 3/2005 | Karichev |
| 6,887,610 B2 | 5/2005 | Elhamid et al. |
| 6,890,680 B2 | 5/2005 | Beckamann et al. |
| 6,916,572 B2 | 7/2005 | Lundsgaard et al. |
| 6,939,636 B2 | 9/2005 | Fuglevand et al. |
| 6,942,941 B2 | 9/2005 | Blunk et al. |
| 6,951,698 B2 | 10/2005 | King |
| 6,955,862 B2 | 10/2005 | Hartnack et al. |
| 6,960,404 B2 | 11/2005 | Goebel |
| 6,972,162 B2 | 12/2005 | Gao et al. |
| 6,974,648 B2 | 12/2005 | Goebel |
| 6,989,216 B2 | 1/2006 | Puttaiah et al. |
| 7,001,687 B1 | 2/2006 | Gaines et al. |
| 7,005,209 B1 | 2/2006 | Gaines et al. |
| 7,014,947 B2 | 3/2006 | Speranza et al. |
| 7,071,121 B2 | 7/2006 | Punsalan et al. |
| 7,087,327 B2 | 8/2006 | Pearson |
| 7,157,177 B2 | 1/2007 | Chan |
| 7,160,642 B2 | 1/2007 | Tarver et al. |
| 7,195,836 B2 | 3/2007 | Lisi et al. |
| 7,205,057 B2 | 4/2007 | McLean |
| 7,205,062 B2 | 4/2007 | Tawfik et al. |
| 7,214,442 B2 | 5/2007 | Ramsey et al. |
| 7,270,906 B2 | 9/2007 | Haltiner, Jr. et al. |
| 7,294,425 B2 | 11/2007 | Hodge et al. |
| 7,297,428 B2 | 11/2007 | Saulsbury et al. |
| 7,309,535 B2 | 12/2007 | Ovshinsky et al. |
| 7,309,539 B2 | 12/2007 | Kato et al. |
| 7,833,645 B2 | 11/2010 | Fuglevand et al. |
| 8,003,274 B2 | 8/2011 | Spink et al. |
| 8,026,020 B2 | 9/2011 | Spink et al. |
| 2002/0045085 A1 | 4/2002 | Formato et al. |
| 2002/0110726 A1 | 8/2002 | Busse et al. |
| 2002/0177039 A1 | 11/2002 | Lu et al. |
| 2003/0013002 A1 | 1/2003 | Jankowski et al. |
| 2003/0035991 A1 | 2/2003 | Colombo et al. |
| 2003/0082431 A1 | 5/2003 | Klitsner et al. |
| 2003/0087151 A1 | 5/2003 | Hamrock |
| 2003/0134178 A1 | 7/2003 | Larson |
| 2003/0170521 A1 | 9/2003 | Zhang |
| 2003/0180603 A1 | 9/2003 | Richards |
| 2003/0198861 A1 | 10/2003 | Bai et al. |
| 2004/0033414 A1 | 2/2004 | Rohrl |
| 2004/0038105 A1 | 2/2004 | Hennige et al. |
| 2004/0043271 A1 | 3/2004 | Wilkinson et al. |
| 2004/0050713 A1 | 3/2004 | Chuang et al. |
| 2004/0054041 A1 | 3/2004 | Schmidt |
| 2004/0077519 A1 | 4/2004 | Price et al. |

| | | | | | | |
|---|---|---|---|---|---|---|
| 2004/0214057 A1* | 10/2004 | Fuglevand et al. ............. 429/20 | | 2008/0032174 A1 | 2/2008 | Fuglevand et al. |
| 2005/0031925 A1 | 2/2005 | Ofer et al. | | 2008/0138684 A1 | 6/2008 | Lewinski et al. |
| 2005/0069780 A1 | 3/2005 | Kinouchi et al. | | 2008/0171255 A1* | 7/2008 | Brantley et al. ................. 429/34 |
| 2005/0079403 A1 | 4/2005 | Lipka et al. | | 2008/0280178 A1 | 11/2008 | Spink et al. |
| 2005/0084741 A1 | 4/2005 | Leddy et al. | | 2008/0305378 A1 | 12/2008 | Spink et al. |
| 2005/0089733 A1 | 4/2005 | Punsalan et al. | | 2009/0075149 A1 | 3/2009 | Haile et al. |
| 2005/0100662 A1 | 5/2005 | Ohba et al. | | 2009/0169939 A1 | 7/2009 | Devries |
| 2005/0103706 A1 | 5/2005 | Bennett et al. | | 2009/0169941 A1 | 7/2009 | Spink et al. |
| 2005/0106440 A1 | 5/2005 | Komiya | | | | |
| 2005/0118185 A1 | 6/2005 | Hombach et al. | | | | |
| 2005/0143517 A1 | 6/2005 | Schmidt | | | | |
| 2006/0014068 A1 | 1/2006 | Boysen et al. | | | | |
| 2006/0134498 A1 | 6/2006 | Hamm et al. | | | | |

FOREIGN PATENT DOCUMENTS

WO  PCT/US2006/39529  10/2006

* cited by examiner

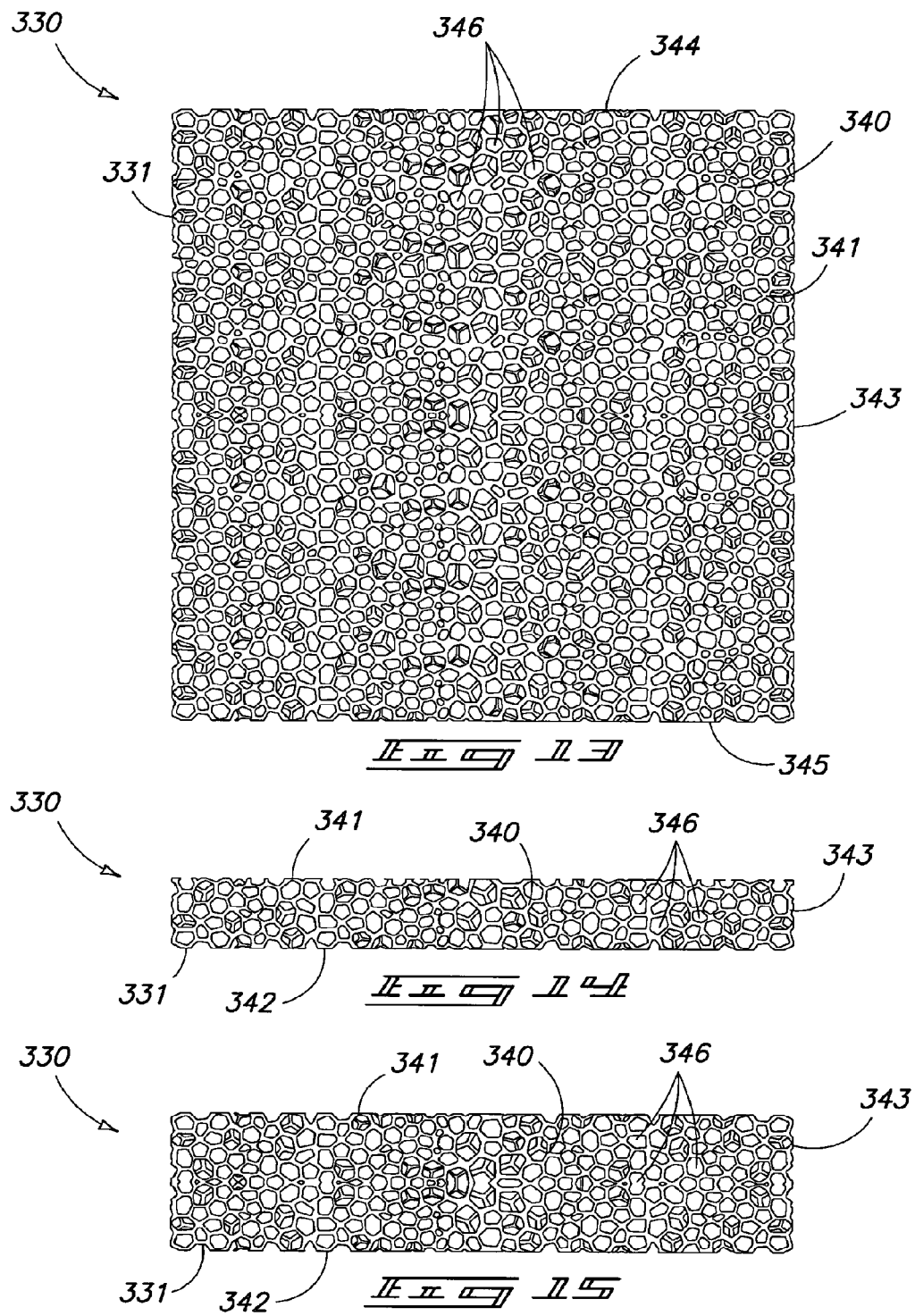

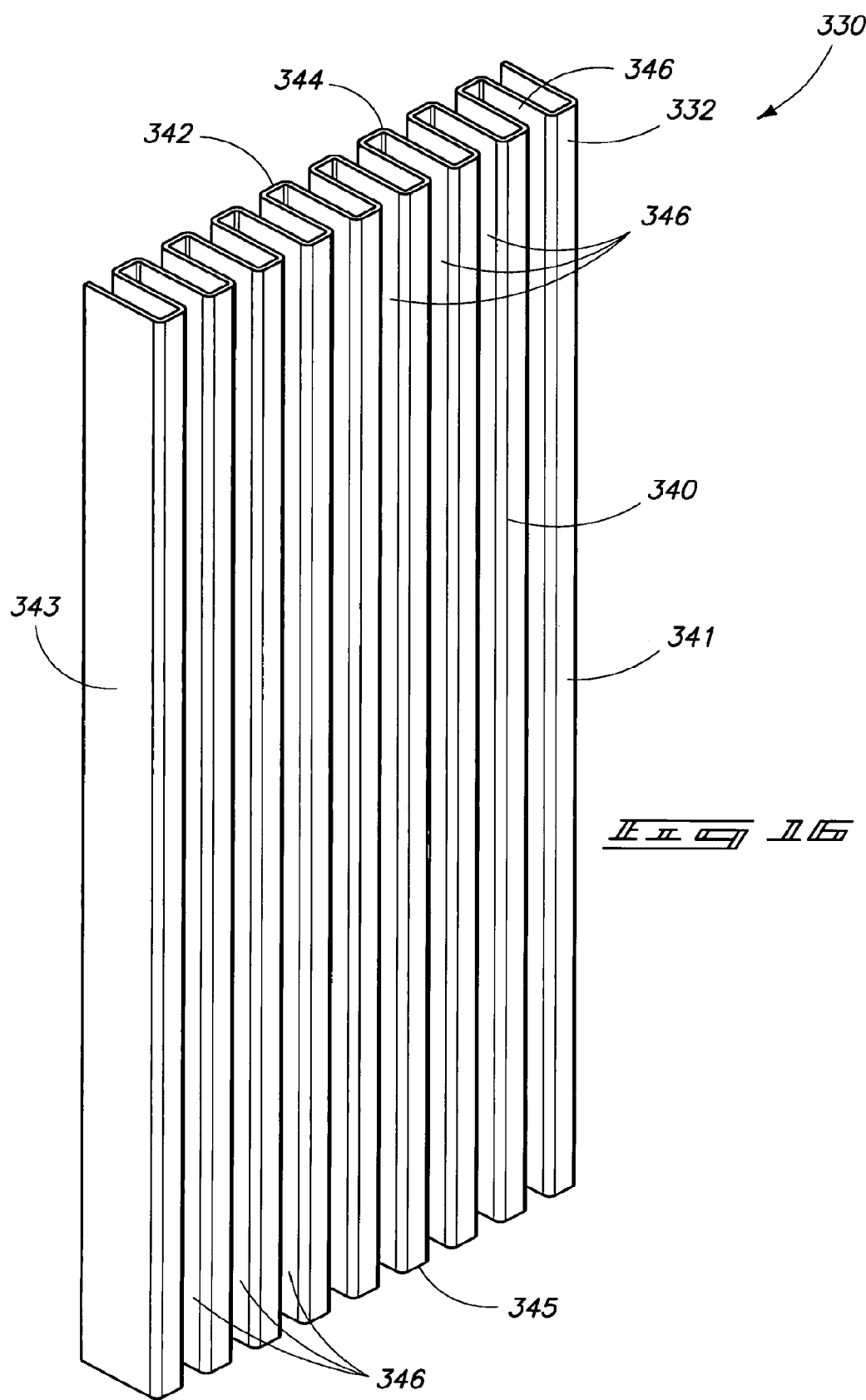

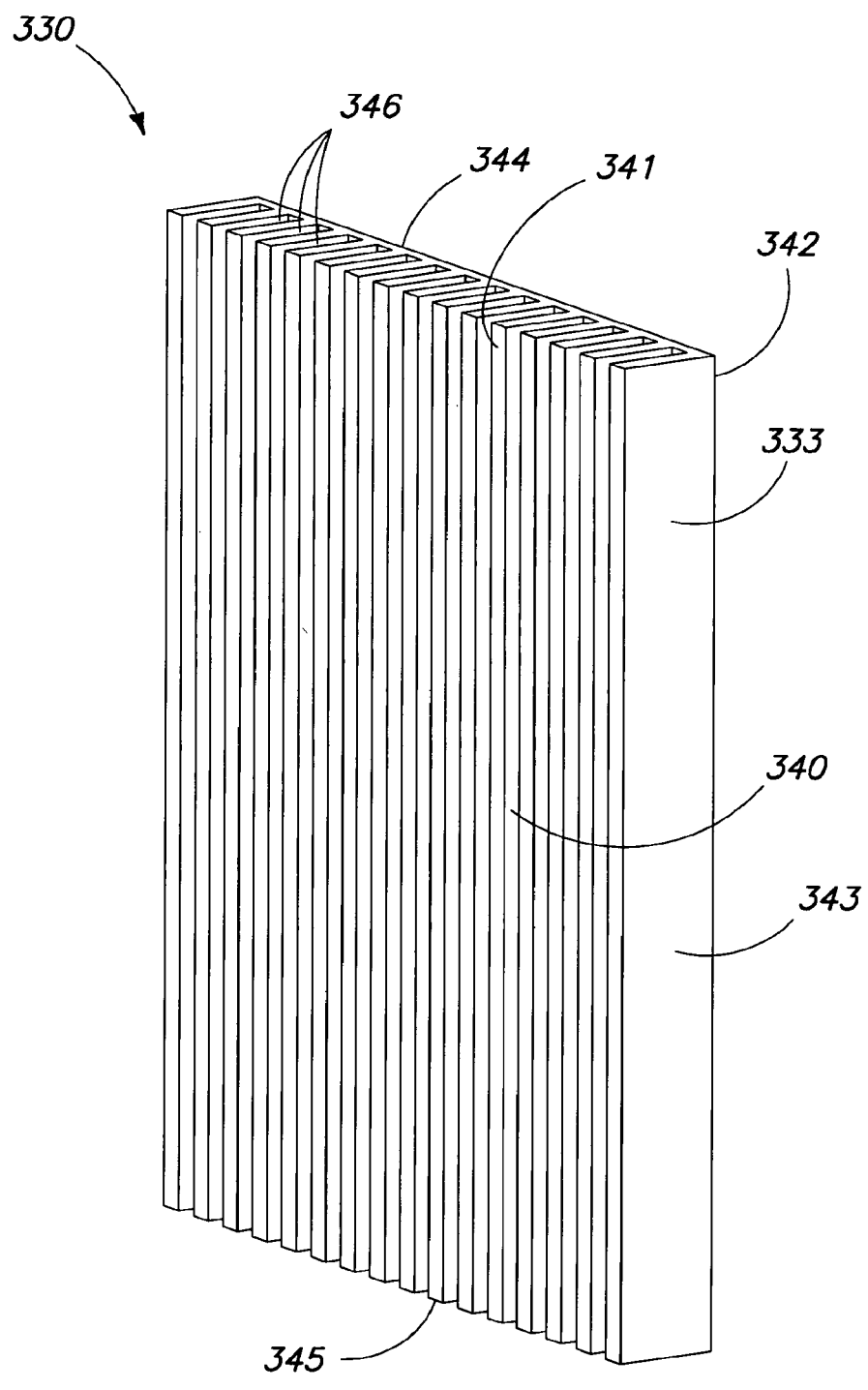

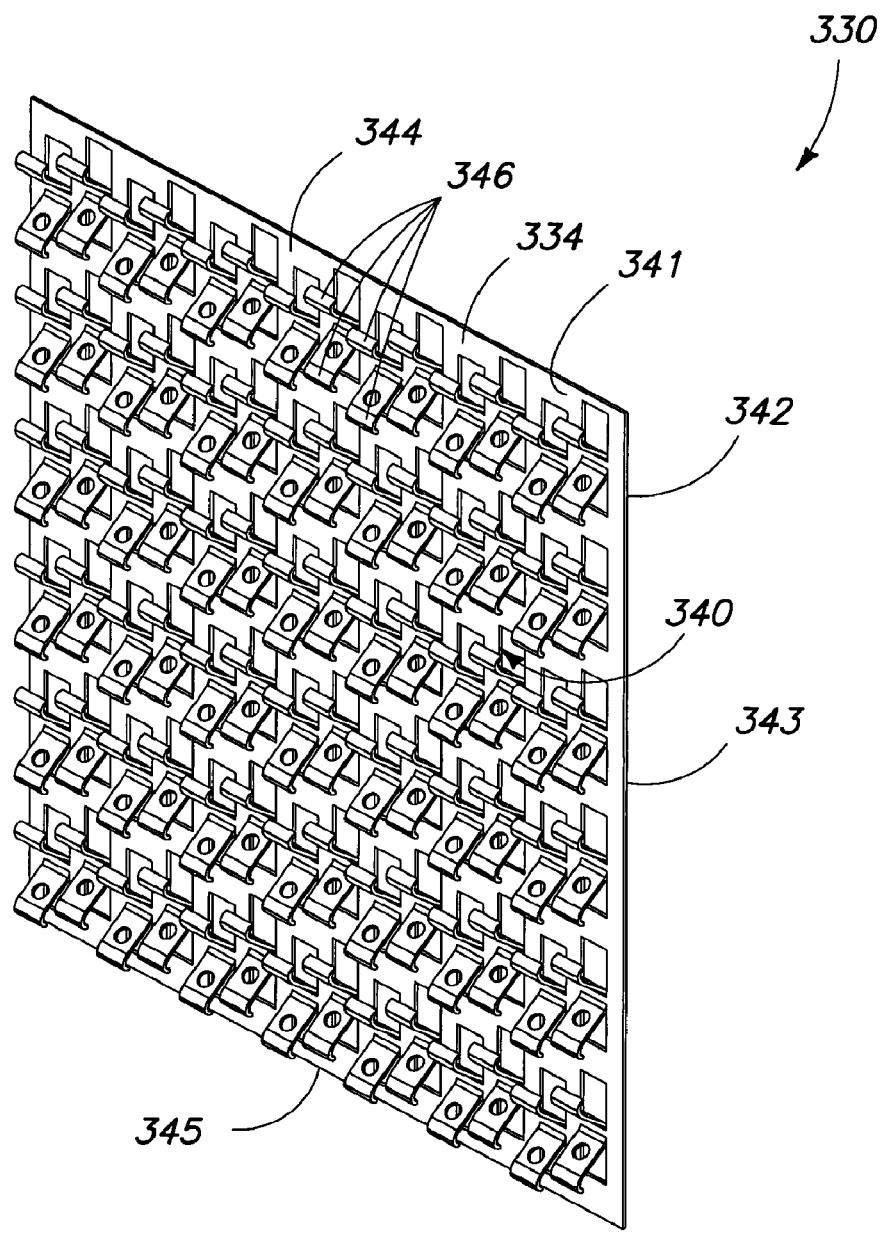

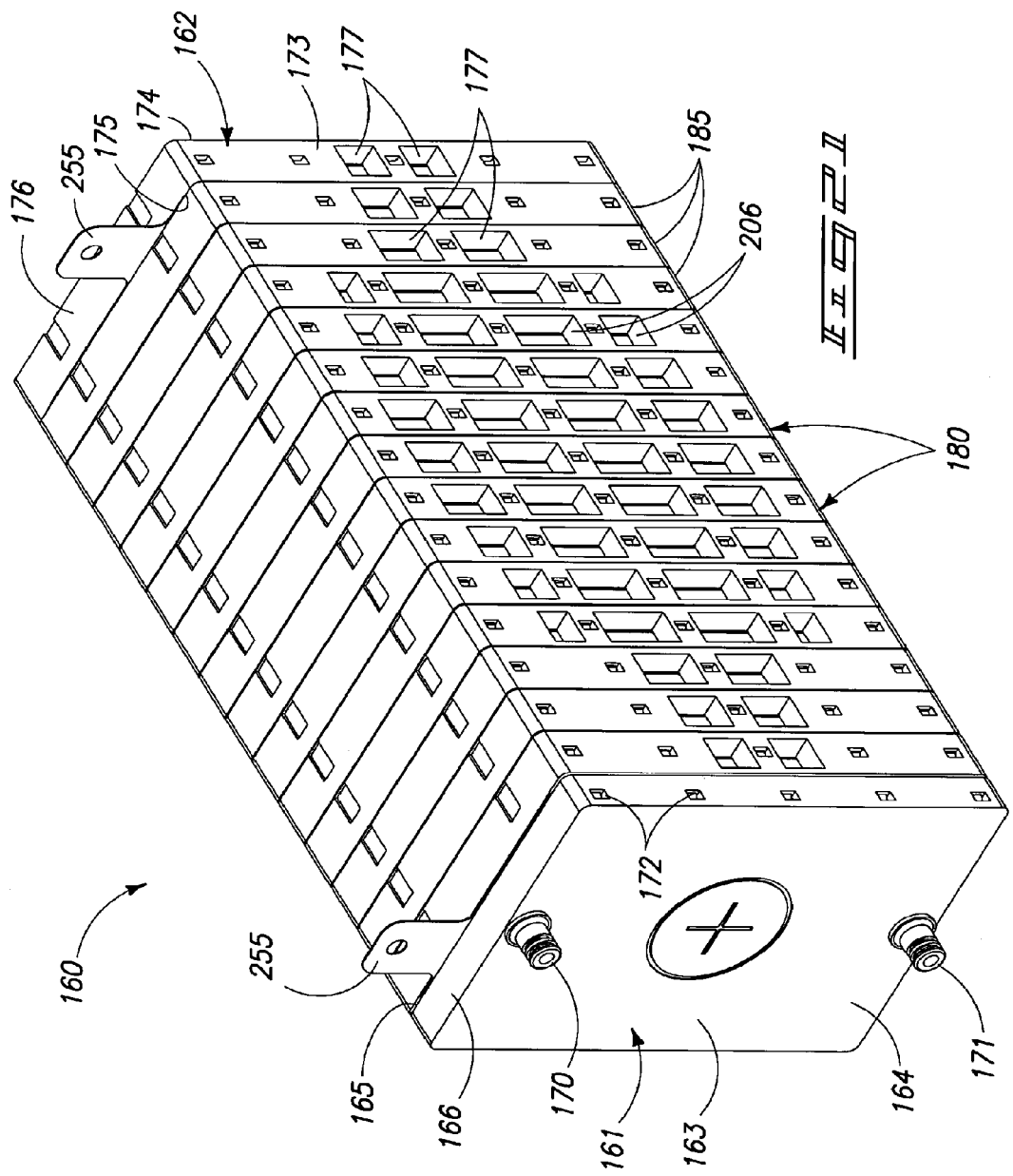

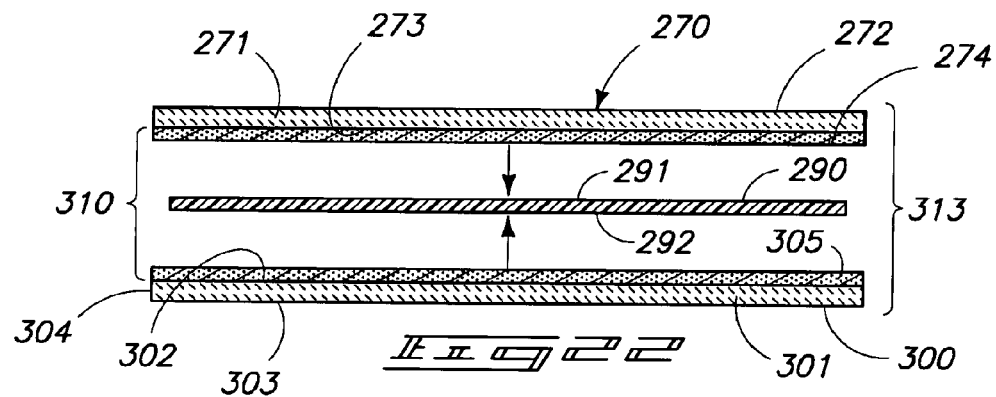
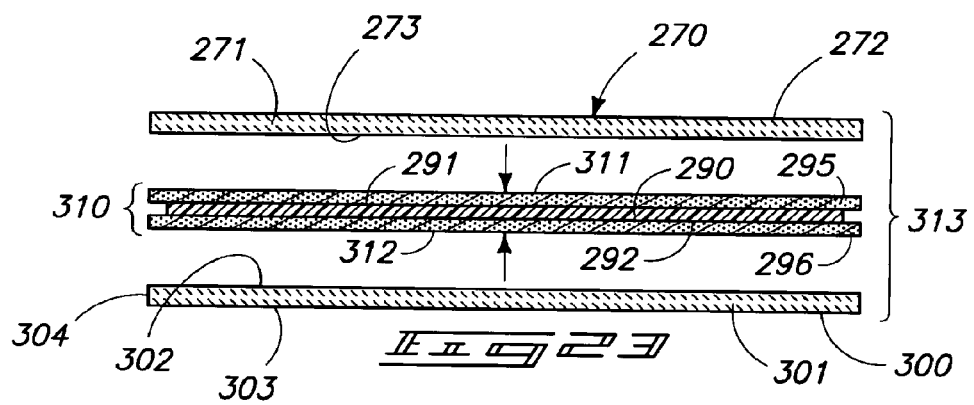
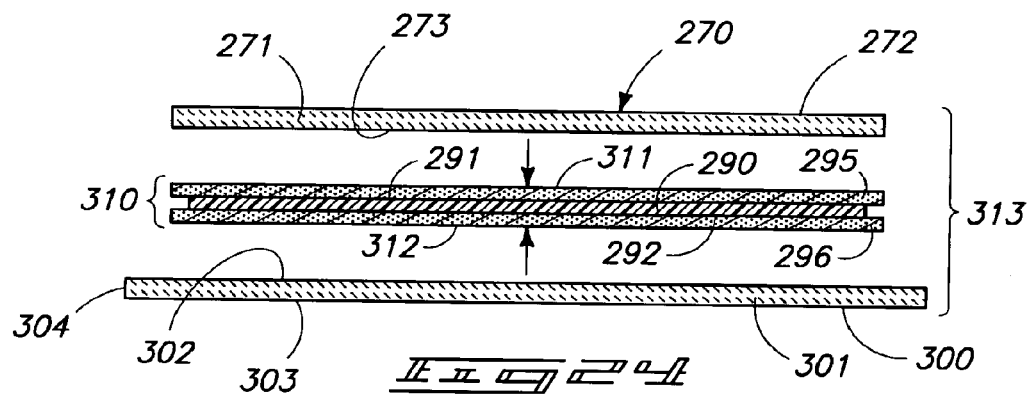

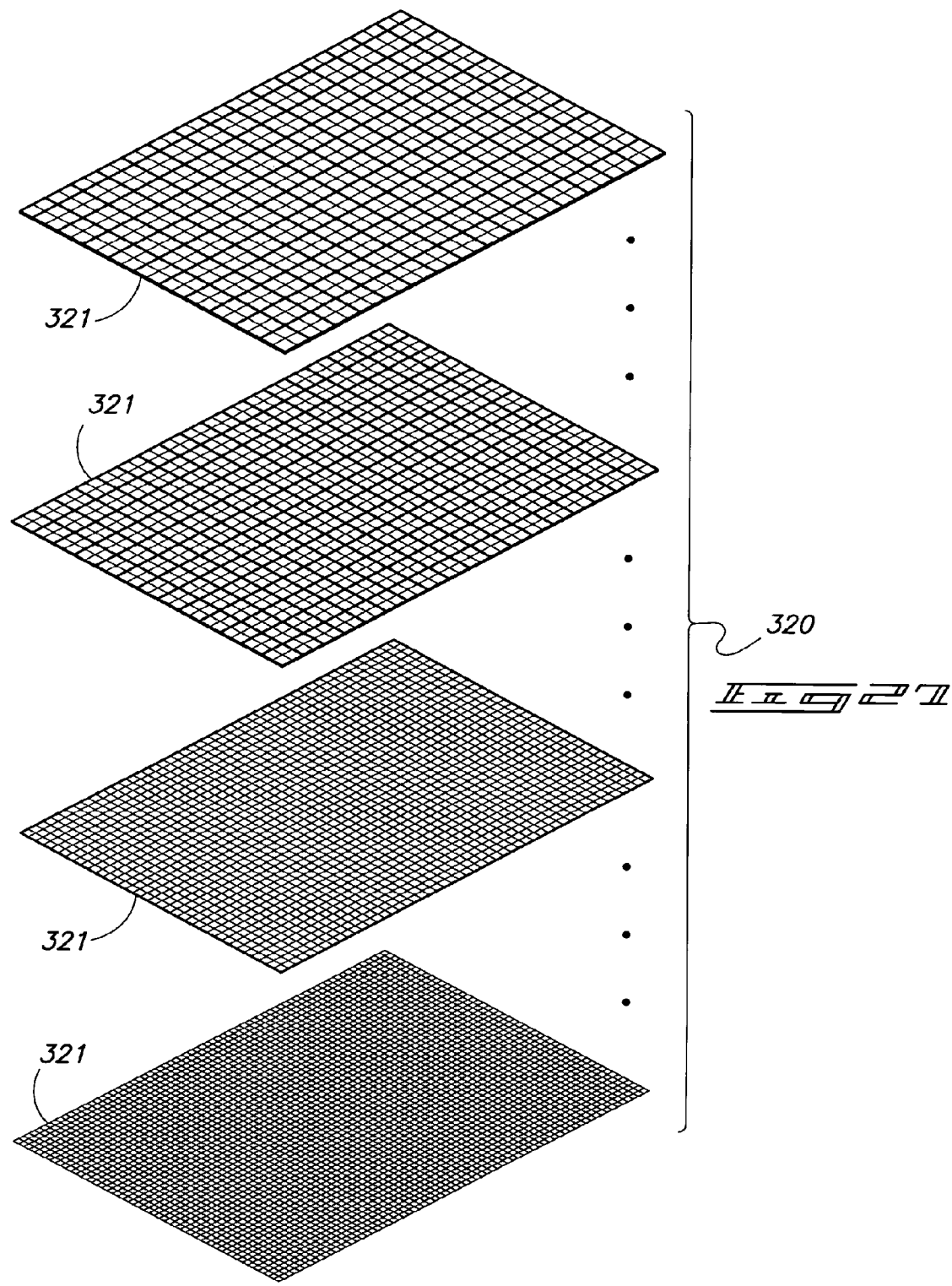

PROTON EXCHANGE MEMBRANE FUEL CELL STACK AND FUEL CELL STACK MODULE

PRIORITY

This utility application is a continuation of, and claims priority from, U.S. application Ser. No. 11/800,994, filed on 2007-05-08.

TECHNICAL FIELD

The present invention relates to a proton exchange membrane fuel cell stack and a fuel cell stack module, and more specifically, to a proton exchange membrane fuel cell stack comprised of a plurality of serially, electrically connected fuel cell stack modules, which are coupled together by a reduced compressive force, and which achieves optimal electrical performance at a pressure less than the reduced compressive force.

BACKGROUND OF THE INVENTION

A fuel cell is an electrochemical device which reacts hydrogen, a fuel source, and oxygen, which is usually derived from the ambient air, to produce electricity, water, and heat. The basic process is highly efficient, and fuel cells fueled by pure hydrogen are substantially pollution free. Further, since fuel cells can be assembled into modules of various sizes, power systems have been developed to produce a wide range of electrical power outputs. As a result of these attributes, fuel cell power systems hold a great deal of promise as an environmentally friendly and viable source of electricity for a great number of applications.

One of a number of known fuel cell technologies is the proton exchange membrane (PEM) fuel cell. The fundamental electrochemical process under which PEM fuel cells operate is well understood and known in the art. A typical single PEM fuel cell produces a useful voltage of about 0.45 to about 0.70 Volts DC, although most fuel cells are operated at about 0.60 Volts DC in order to extract the greatest efficiency from same. To achieve a useful voltage, typically a number of individual fuel cells are electrically combined or coupled in series. In one common configuration, a number of individual fuel cells are electrically coupled in series in the form of a fuel cell stack. In a stack configuration, the anode of one fuel cell is electrically coupled to the cathode of another fuel cell in order to connect the two fuel cells in series. Any number of fuel cells can be similarly stacked together to achieve the desired output voltage and current. Typically, these individual fuel cells are separated by an electrically conductive bipolar separator plate. Further, the individual fuel cells are placed between two end plates and a substantial compressive force is applied to same in order to effectively seal same, and to achieve an operatively effective ohmic electrical connection between the respective fuel cells.

In addition to the relatively low operating temperature PEM fuel cells noted, above Solid Oxide Fuel Cells (SOFC) have been developed. A SOFC is a fuel cell which generates electricity directly from a chemical reaction, yet unlike PEM fuel cells, an SOFC is typically composed of solid ceramic materials. The selection of the materials employed in such prior art SOFC devices is dictated, to a large degree, by the high operating temperatures (600-800 degrees C.) which are experienced by such devices. In view of the extremely high operating temperatures which are needed to render the ceramic based electrolyte ionically active, SOFC devices do not require the use of an expensive catalyst (platinum), which is the case with PEM fuel cells as discussed, above. As a result of these high operating temperatures, assorted fuels can be employed with a SOFC which could not normally be used in a PEM fuel cell. Therefore, SOFC devices can employ fuels such as methane, propane, butane, fermentation gas, gasified biomass, etc. In a typical SOFC device, a ceramic based electrolyte formed of a material such as zirconium oxide is sandwiched between a porous, electrically conductive cathode layer, and a porous, electrically conductive anode layer. These cathode and anode layers are typically ceramic gas diffusion layers that are selected for their structural rigidity and high temperature tolerance. The chosen electrolyte must be impervious to air (oxygen) and must be electrically insulating so that the electrons resulting from the oxidation reaction on the anode side are forced to travel through an external circuit before reaching the cathode side of the SOFC. In a typical SOFC device a metal or electrically conductive interconnect electrically couples the respective cells in a serial arrangement. If a ceramic interconnect is employed it must be extremely stable because it is exposed to both the oxidizing and reducing side of the SOFC at high temperatures.

As should be understood from the discussion above, the cost of fabricating such SOFC devices is significant. Further, to render such devices operational, a rather significant and sophisticated balance of plant arrangement must be employed to controllably heat the SOFC device up to an operational temperature, and then maintain the device within an acceptable temperature range. In contrast, PEM fuel cells do not need the extremely high temperatures employed in SOFC devices in order to render the electrolyte (typically Nafion) ionically active. Further these high temperatures have dictated the use of heat tolerant ceramic materials for the anode and cathode. The cost of fabricating these components is significant. In typical PEM fuel cell devices, the designers of same have continually strived to employ lower cost components, and simplify any balance of plant requirements in order to reduce the cost of same and make the cost per watt of power generated more acceptable for discreet market applications.

While traditional PEM fuel cell stacks have operated with some degree of success, a number of shortcomings continue to distract from their usefulness. First among these shortcomings is the high cost of manufacture for the individual components of a traditional stack design. Chief among these high cost components is the bipolar plate which is employed with same. In order to save costs, many manufacturers of fuel cell stacks have attempted to combine a number of functions into the bipolar plate. A modern bipolar plate is a precisely fabricated component that performs a number of functions including fuel management, cooling, electrical conduction, and gas separation. The result of this combination of functions is that performance in many areas must be sacrificed in order to save costs. Examples of such an arrangement are seen in U.S. Pat. Nos. 5,252,410, and 5,863,671, the teachings of which are incorporated by reference herein.

Another primary cost or factor which impacts a traditional fuel cell stack is that attributed to the force compression needed to make such devices operational. In order to achieve an operationally effective electrical conductivity between a proton exchange membrane, a gas diffusion layer, and/or a bipolar plate, a great deal of force must be applied between the end plates of the traditional stack. Typically, these compression forces are in excess of 100 pounds per square inch. To achieve this level of compressive force, costly, heavy, and complex components are often required. The application of this force typically compresses same components within a stack, for those components which are porous, this same force may reduce the porosity of same. Yet another shortcoming attributable to the traditional fuel cell stack design or arrangement is heat management. Because a fuel cell generates heat while generating electricity, excess heat is often created and accumulates in the center and other locations within the stack. A number of sophisticated technologies and designs have been developed to manage these hotspots, but the result has been higher manufacturing costs and greater complexity for a resulting fuel cell stack system.

One proposed solution to the problems associated with the cost and complexity of prior art force compression arrangements was disclosed in U.S. Pat. No. 6,716,549, the teachings of which are hereby incorporated by reference. This proposed solution involved coating a surface of a traditional, rigid, carbon gas diffusion layer with a metal such that the resulting metalized gas diffusion layer retained its porosity. The resulting metalized surface of the carbon gas diffusion layer forms an ohmic contact with an adjacent metal current collector without the need for the high compression forces that would typically be required without the metal layer. While this solution addresses some of the issues associated with force compression, it still requires the use of a rigid carbon, gas diffusion layer, which has become increasingly costly and difficult to procure. Thus, a long felt need remains for a lower cost, and higher performing alternative to the prior art high force compression proton exchange membrane fuel cell stacks which are now disclosed in the art.

The prior art is replete with numerous examples of other prior art fuel cell devices that attempt to address these and other issues. The Office's attention is directed to U.S. Pat. Nos. 5,470,671; 5,482,792; and U.S. Application Publication No. 2006/0134498; the teachings of which are incorporated by reference herein.

A proton exchange membrane fuel cell stack and an associated proton exchange membrane fuel cell stack module which avoids the shortcomings attendant with the prior art devices and practices utilized heretofore is the subject matter of the present application.

SUMMARY OF THE INVENTION

A first aspect of the present invention relates to a proton exchange membrane fuel cell stack which includes a plurality of repeating, serially electrically coupled fuel cell stack modules, which are sealably mounted together by a compressive force of less than about 60 pounds per square inch.

Another aspect of the present invention relates to a proton exchange membrane fuel cell stack which includes first and second endplates disposed in substantially parallel spaced relation; and a plurality of repeating, air-cooled, fuel cell stack modules positioned between the first and second endplates, and which are serially electrically coupled together, and wherein the respective endplates sealably couple the respective fuel cell stack modules together by applying a compressive force of less than about 60 pounds per square inch to each of the respective fuel cell stack modules, and wherein the proton exchange membrane fuel cell stack has an operational temperature profile as measured between the first and second end plates which varies by less than about 10%.

Still another aspect of the present invention relates to a proton exchange membrane fuel cell stack module which includes a proton exchange membrane having an anode side, and a cathode side; a first gas diffusion layer juxtaposed relative to the anode side; a second gas diffusion layer juxtaposed relative to the cathode side; an electrically conductive heat sink having a thermally conductive mass juxtaposed relative to the second gas diffusion layer; and a current collecting separator plate juxtaposed in ohmic electrical contact relative to the first gas diffusion layer, and wherein a plurality of fuel cell stack modules are electrically connected in series, and are further mounted between a first and second endplate to form a fuel cell stack, and wherein the current collecting separator plate of a first fuel cell module is juxtaposed relative to the first endplate, and wherein the heat sink of a remote, second fuel cell module is positioned in force receiving relation relative to the second endplate, and wherein the first and second endplates provide a compressive force of less than about 60 pounds per square inch to each of the plurality of proton exchange membrane fuel cell stack modules.

Yet another aspect of the present invention relates to a proton exchange membrane fuel cell stack which includes a plurality of repeating, serially electrically coupled fuel cell stack modules, which are sealably mounted together by a compressive force of less than about 60 pounds per square inch, and wherein the respective fuel cell stack modules further comprise a frame having an inside and an outside peripheral edge, and first and second sides, and wherein the inside peripheral edge defines an internal cavity, and wherein the respective frames are self-aligning and matingly nest together in an operational orientation, and wherein the respective frames each define an air passageway which extends between the inside and outside peripheral edges and which communicates with the internal cavity thereof.

Further, another aspect of the present invention relates to a proton exchange membrane fuel cell stack module which includes a proton exchange membrane having an anode side, and a cathode side; a first gas diffusion layer juxtaposed relative to the anode side; a second gas diffusion layer juxtaposed relative to the cathode side; an electrically conductive heat sink juxtaposed relative to the second gas diffusion layer; a frame having an inside and an outside peripheral edge, and first and second sides, and wherein the inside peripheral edge defines an internal cavity therewithin the frame, and wherein the proton exchange membrane, the first and second gas diffusion layers, and the heat sink are enclosed within the internal cavity; and a first current collecting separator plate mounted on the first side of the frame, and juxtaposed relative to the first gas diffusion layer, so as to form a fuel cell stack module, and wherein a plurality of fuel cell stack modules are positioned between a first and a second endplate, and are further serially electrically coupled together, and wherein the respective endplates apply a compressive force of less than about 60 pounds per square inch on each of the respective fuel cell stack modules.

Another aspect of the present invention relates to a proton exchange membrane fuel cell stack which includes a plurality of repeating serially electrically coupled fuel cell stack modules, each defining an internal cavity and which are sealably mounted together by a compressive force of less than about 60 pounds per square inch; and a proton exchange membrane is placed in a operational orientation relative to at least one ceramic gas diffusion layer and which is received within the cavity of the respective fuel cell stack modules.

Still another aspect of the present invention relates to a proton exchange membrane fuel cell stack which includes first and second endplates disposed in substantially parallel spaced relation; and a plurality of repeating, air-cooled, fuel cell stack modules positioned between the first and second endplates, and which are serially electrically coupled together, and which further has an operationally effective conductivity, as measured between the first and second endplates, which is achieved at a pressure less than a compressive force applied to each of the plurality of the fuel cell stack modules, and which further has an operationally effective temperature profile as measured between the first and second end plates which is substantially uniform.

Yet another aspect of the present invention relates to a proton exchange membrane fuel cell stack module which includes a proton exchange membrane having an anode side and a cathode side; a first electrically conductive ceramic layer juxtaposed relative to the anode side; a second electrically conductive ceramic layer juxtaposed relative to the cathode side; an electrically conductive heat sink juxtaposed relative to the second electrically conductive ceramic layer; a frame having an inside and an outside peripheral edge, and first and second sides, and wherein the inside peripheral edge defines an internal cavity, and wherein the respective frames each define an air passageway which extends between the inside and outside peripheral edges and which communicates with internal cavity thereof, and wherein the proton exchange membrane, first and second electrically conductive ceramic layers, and the electrically conductive heat sink are enclosed within the internal cavity; and a current collecting separator plate mounted on the first side of the frame, and which is juxtaposed relative to the first electrically conductive ceramic layer.

Another aspect of the present invention relates to a proton exchange membrane fuel cell stack which includes a first endplate and an opposite second endplate; a plurality of fuel cell stack modules mounted between each of the first and second endplates, and wherein each of the fuel cell stack modules further include a proton exchange membrane having an anode side and a cathode side; a first electrically conductive ceramic diffusion layer juxtaposed relative to the anode side; a second electrically conductive ceramic gas diffusion layer juxtaposed relative to the cathode side; an electrically conductive heat sink juxtaposed relative to the second ceramic gas diffusion layer, and wherein the heat sink defines a plurality of fluid passageways which permits a source of air to pass therethrough and reach the second ceramic gas diffusion layer; a frame having first and second sides and an inside and an outside peripheral edge, and wherein the inside peripheral edge defines an internal cavity, and wherein the proton exchange membrane, the first and second ceramic gas diffusion layers, and the heat sink are enclosed within the internal cavity, and wherein the frame defines a fuel and exhaust gas passageway, which are each disposed in fluid flowing relation relative to the first ceramic gas diffusion layer, and wherein the frame further defines an air passageway, which is oriented in fluid flowing relation relative to the heat sink, and wherein the frame further has a mounting flange which extends into the internal cavity, and substantially circumscribes the inside peripheral edge of the frame, and wherein the proton exchange membrane is sealably affixed to the mounting flange; a first current collecting separator plate mounted on the first side of the frame, and juxtaposed relative to the first gas diffusion layer; and a second current collecting separator plate juxtaposed relative to the second endplate, and wherein the first current collecting separator plate of a first fuel cell module is juxtaposed relative to the first endplate, and wherein the second current collecting separator plate is juxtaposed relative to the heat sink of a second fuel cell module, which is located adjacent to the second endplate, and wherein the first and second endplates provide a compressive force to each of the plurality of fuel cell modules which is less than about 60 pounds per square inch.

Another aspect of the present invention relates to a proton exchange membrane fuel cell stack which includes a plurality of frames, each having an inside and an outside peripheral edge, and first and second sides, and wherein the inside peripheral edge defines an internal cavity, and wherein the respective frames are self-aligning and matingly nest together in an operational orientation, and wherein the respective frames each define an air passageway which extends between the inside and outside peripheral edges and which communicates with the internal cavity thereof, and wherein each of the respective frames further defines a fuel gas passageway which is coupled in fluid flowing relation relative to a plurality of fuel gas channels, and which are defined, at least in part, by the first side of each of the frames, and wherein each of the fuel gas channels are coupled in fluid flowing relation to the internal cavity of the frame, and wherein the individual fuel gas passageways of the respective fuel cell stack modules are each coupled in fluid flowing relation, one relative to the others, and wherein the frame further defines an exhaust gas passageway which is coupled in fluid flowing relation relative to a plurality of exhaust gas channels, and which are defined, at least in part, by the first side of the frame, and wherein the individual exhaust gas channels are coupled in fluid flowing relation to the internal cavity of the frame, and wherein the individual exhaust gas passageways of the respective fuel cell stack modules are each coupled in fluid flowing relation, one relative to the others; a mounting flange made integral with the inside peripheral edge of each of the frames, and which is disposed in a substantially coplanar orientation relative to the first side of each of the frames, and wherein the mounting flange extends into the internal cavity of each of the frames and defines an aperture which communicates with the internal cavity of the frames, and wherein the mounting flange has first and second sides, and a thickness dimension defined by the distance between the first and second sides; a first gas diffusion layer having an inside and an outside facing surface, and which is positioned within the internal cavity of the frame, and wherein the outside facing surface of the first gas diffusion layer is oriented in a substantially coplanar orientation relative to the first side of the frame, and has a thickness dimension substantially similar to the thickness dimension of the mounting flange, and wherein the first gas diffusion layer substantially occludes the aperture defined by the mounting flange; a proton exchange membrane received within the internal cavity of the frame, and disposed in resting, sealing relation relative to the mounting flange, and wherein the proton exchange membrane has an anode side which is juxtaposed relative to the inside facing surface of the first gas diffusion layer, and an opposite cathode side; a second gas diffusion layer which is positioned within the internal cavity of the frame and which is juxtaposed relative to the cathode side of the proton exchange membrane; an electrically conductive heat sink having an inside and an outside facing surface, and which is received within the internal cavity of each of the frames, and wherein the inside facing surface thereof is juxtaposed relative to the second gas diffusion layer, and wherein the outside facing surface of the heat sink is oriented in a substantially coplanar orientation relative to the second side of each of the frames, and is further oriented in fluid flowing relation relative to the air passageway which is defined by the frame, and wherein the heat sink has a thickness dimension which is greater than about 10 millimeters; a current collecting separator plate mounted on the first side of each of the frames, and which is further positioned, at least in part, in ohmic electrical contact with the first gas diffusion layer, and wherein the electrically conductive heat sink is disposed in ohmic electrical contact with the current collecting separator plate of an adjacent fuel cell stack module, and wherein the current collecting separator plate matingly couples with, and is self-aligning relative to, the frame, and wherein the current collecting separator plate is further a non-porous, substantially smooth metal plate which is bonded to the first side of the frame so as to effectively seal the plurality of fuel gas, and exhaust gas channels which are defined by the first side of the frame; and a first and a second endplate which are disposed in predetermined spaced relation, one relative to the other, and wherein the plurality of frames are located between, and are disposed in force receiving relation relative to, the first and second endplates, and wherein the respective first and second endplates exert a compressive force of less than about 60 pounds per square inch to each of the respective frames.

Yet another aspect of the present invention relates to a proton exchange membrane fuel cell stack which includes a plurality of proton exchange membranes each having an anode side, and a cathode side; a first porous, electrically conductive ceramic layer juxtaposed relative to the anode side of each of the proton exchange membranes; and a second porous, electrically conductive ceramic layer juxtaposed relative to the cathode side of each of the proton exchange membranes, and wherein the proton exchange membrane fuel cell stack has an operational temperature which is less than about 200 degrees C.

Still another aspect of the present invention relates to a proton exchange membrane fuel cell stack which includes a plurality of repeating, serially electrically coupled fuel cell stack modules, which are sealably mounted together by a compressive force of less than about 60 pounds per square inch, and wherein the respective fuel cell stack modules further comprise a frame having an inside and an outside peripheral edge, and wherein the inside peripheral edge defines an internal cavity, and wherein the respective frames each define an air passageway having a cross sectional area, and which extends between the inside and outside peripheral edges, and which further communicates with the internal cavity thereof, and wherein a proton exchange membrane having an effective operating temperature is received within the internal cavity of each of the frames, and wherein an electrically conductive heat sink having a thermally conductive mass is received within the internal cavity of the respective frames, and which is further oriented in fluid flowing relation relative to the air passageway which is defined by the frame, and which dissipates heat energy generated by the proton exchange membrane, during operation, and wherein the operating temperatures of the respective proton exchange membranes of the proton exchange membrane fuel cell stack are within less than about ten percent of each other.

Yet another aspect of the present invention relates to a proton exchange membrane fuel cell stack module which includes a proton exchange membrane having an anode side, and a cathode side, and wherein the anode and cathode sides each have an active area surface, and wherein the active area surface of at least one of the anode side or the cathode side of the proton exchange membrane, and/or a fuel cell component having a region which is oriented at least in partial covering relation relative thereto, is substantially devoid of predetermined passageways for accommodating the flow of a reactant gas.

Still another aspect of the present invention relates to a proton exchange membrane fuel cell stack which includes a plurality of proton exchange membranes, each having an anode side, and a cathode side, and wherein each of the anode and cathode sides have an active area surface, and wherein the active area surface of the anode side of the proton exchange membrane, and a fuel cell stack component having a region in at least partial covering relation relative to the active area surface of the anode side, are both substantially devoid of predetermined passageways for accommodating the flow of a reactant gas; a plurality of first gas diffusion layers juxtaposed relative to each of the anode sides, respectively; a plurality of second gas diffusion layers juxtaposed relative to each of the cathodes side, respectively; and a plurality of current collecting separator plates juxtaposed in ohmic electrical contact relative to each of the first gas diffusion layers, respectively.

These and other aspects of the present invention will be described in greater detail hereinafter.

BRIEF DESCRIPTION OF THE DRAWINGS

Preferred embodiments of the invention are described below with reference to the following accompanying drawings.

FIG. 13 is a top plan view of one form of a heat sink, fabricated from a reticulated metal foam, and which forms a feature of the present invention.

FIG. 14 is a side elevation view of the same heat sink as seen in FIG. 13.

FIG. 15 is a second, side elevation view of the same heat sink as seen in FIG. 13 and which is fabricated with different dimensions.

FIG. 16 is a perspective, side elevation view of a corrugated metal heat sink which forms a feature of the present invention.

FIG. 17 is a perspective, side elevation view of an extruded aluminum heat sink which forms a feature of the present invention.

FIG. 18 is a perspective, side elevation view of a stamped, resilient, reticulated heat sink which forms a feature of the present invention.

FIG. 21 is a perspective, side elevation view of yet another form of a proton exchange membrane fuel cell stack which forms a feature of the present invention.

FIG. 22 is a greatly exaggerated, exploded, transverse, vertical sectional view of a proton exchange membrane positioned between ceramic gas diffusion layers, each having a catalyst layer applied thereto.

FIG. 23 is a greatly enlarged, exploded, transverse, vertical sectional view of a proton exchange membrane electrode assembly and which is positioned therebetween a pair of ceramic gas diffusion layers.

FIG. 24 is a greatly enlarged, exploded, transverse, vertical sectional view showing a proton exchange membrane electrode assembly positioned therebetween two ceramic gas diffusion layers, and wherein one gas diffusion layer is larger than the other.

FIG. 27 is a perspective exploded, greatly enlarged, transverse, vertical sectional view of a sintered metal mesh, which is used in one form of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
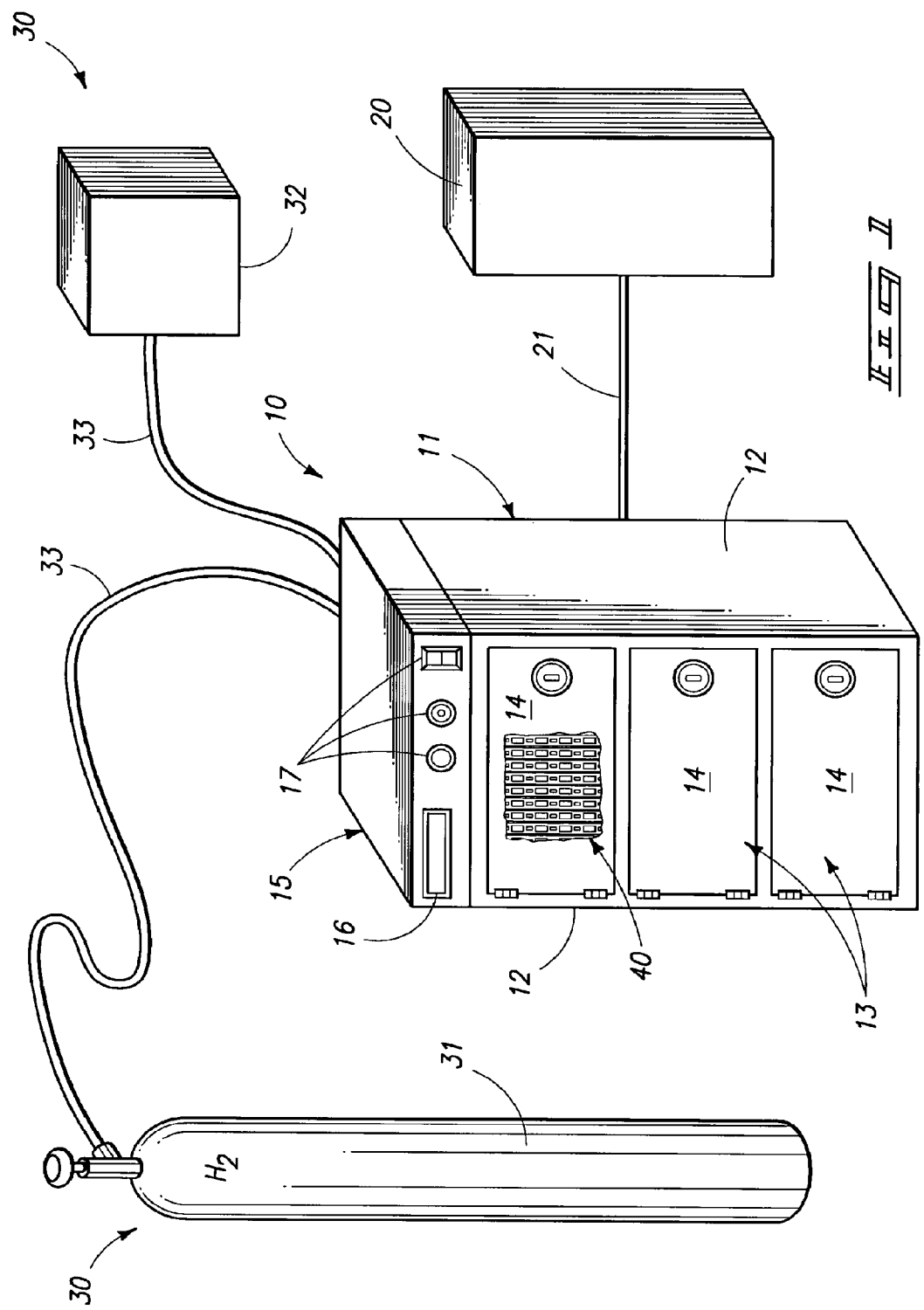
FIG. 1 is a schematic representation of a fuel cell power system which employs features of the present invention.

Referring now to FIG. 1, a proton exchange membrane (PEM) fuel cell stack power system is generally indicated by the numeral 10 therein. As seen in this greatly simplified view, the PEM fuel cell stack power system 10 includes an air-permeable housing or cabinet 11 which may be mounted on a supporting surface (not shown). The housing 11 includes a plurality of sidewalls 12, which define individual compartments, and further support subracks, which are generally indicated by the numeral 13, and which support and otherwise enclose, at least in part, the novel proton exchange membrane fuel cell stacks which will be discussed in greater detail hereinafter. The housing 11 may further support individual moveable doors 14 which allow an operator (not shown) to gain access to the individual compartments for repair or replacement of the individual proton exchange membrane fuel cell stacks that will be described below. Still further, the fuel cell stack power system 10 includes a digital control system which is generally indicated by the numeral 15, and which is mounted typically on the housing 11, but which could also be positioned remotely relative thereto. The digital control system 15 which controls the operation of the fuel cell power stack system 10 is well known in the art. The Office's attention is specifically directed to U.S. Pat. No. 6,387,556, the teachings of which are incorporated by reference herein. The digital control system 15 may include, among other things, an alpha-numeric display 16 which provides information to an operator regarding the operational features and performance of the fuel cell stack power system 10, and further may include other controls 17, such as switches, dials, and the like, which allow an operator (not shown) to control the operation of the fuel cell stack power system 10.

The invention 10 as seen in FIG. 1 contemplates an electrical arrangement whereby a proton exchange membrane fuel cell stack, as will be described hereinafter, may be deactivated and removed from the housing or cabinet 11 while the remaining proton exchange membrane fuel cell stacks, as will be described, remain operational and continue to service a load 20 as seen in FIG. 1. This performance feature is well known in the art and has been employed heretofore in modular fuel cells which are more fully described in such references as U.S. Pat. Nos. 6,030,718 and 6,468,682, the teachings of which are incorporated by reference herein, and others. As seen in FIG. 1, an electrical conduit 21 electrically couples the proton exchange membrane fuel cell power system 10 with the electrical load 20 to be serviced. The proton exchange membrane fuel cell power system 10 generates electricity by well known means as described earlier in this application. The proton exchange membrane fuel cell stack, as will be described below, is supplied with a reactant fuel gas from a source generally indicated by the numeral 30. The source of the reactant fuel gas 30 may also be a pressurized hydrogen bottle 31 which provides pure hydrogen under pressure to the proton exchange membrane fuel cell power system 10. Still further, the source of reactant fuel gas 30 may include a hydrogen generator, fuel processor, or reformer 32 which may provide a hydrogen rich reformate stream or substantially pure hydrogen to the proton exchange membrane fuel cell power system 10. As seen in FIG. 1, each of the sources of a reactant fuel gas 30 may be coupled to the fuel cell power system 10 by means of hydrogen delivery conduits, generally indicated by the numeral 33.

Figure 4:
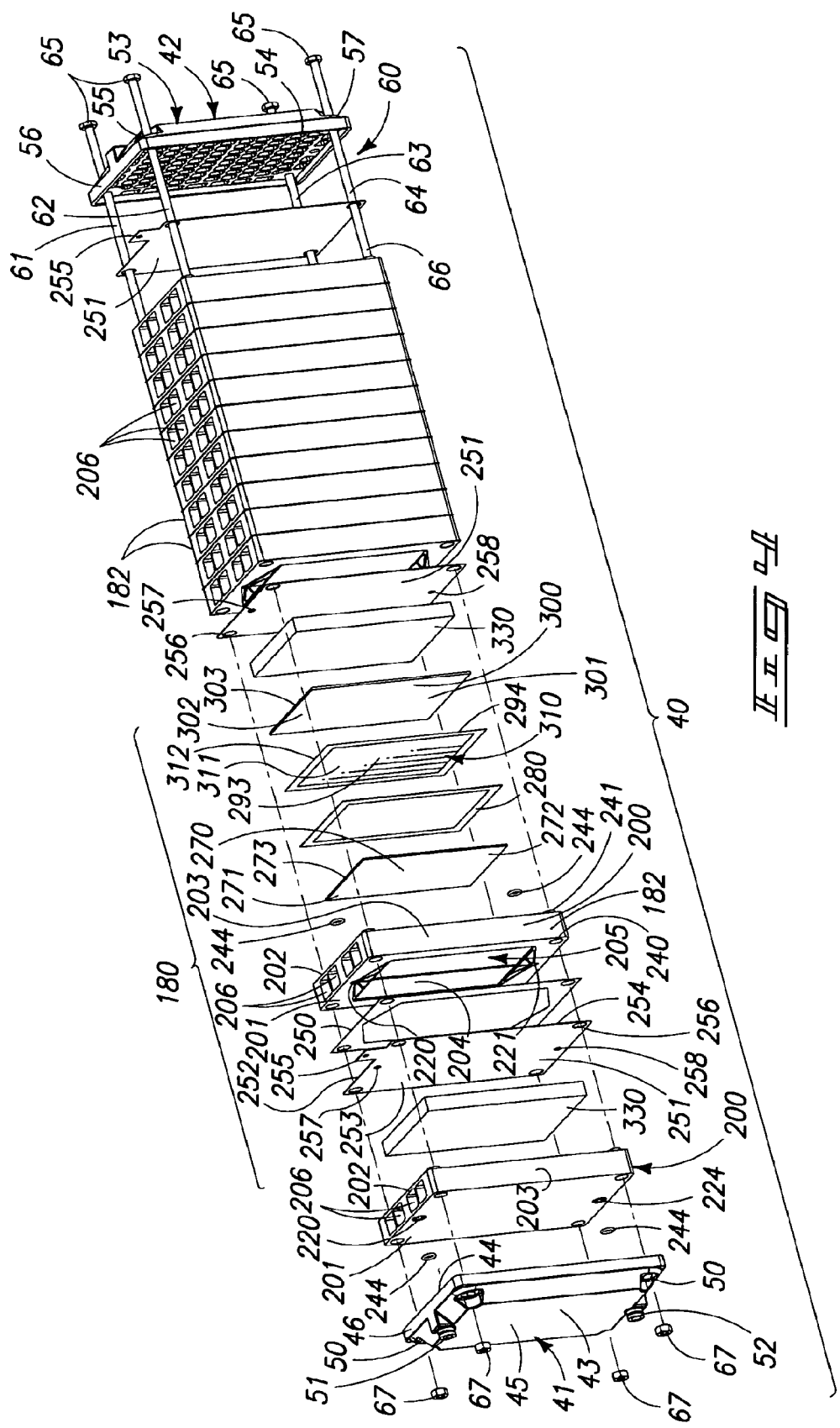
FIG. 4 is an exploded perspective view of another form of a proton exchange membrane fuel cell stack of the present invention.

One possible form of a proton exchange membrane fuel cell stack which forms a feature of the present invention is generally indicated by the numeral 40 in FIG. 4. As best seen in FIG. 4, this form of the proton exchange membrane fuel cell stack 40 includes a first end plate 41 and a second end plate 42. The first end plate 41 has a main body generally indicated by the numeral 43. The main body includes an inside facing surface 44, and an opposite outside facing surface 45. Still further, the main body is defined by a peripheral edge 46. As seen in FIG. 4, for example, it should be understood that tie rod apertures 50 are formed in the main body 43 and extend between the inside and outside facing surfaces 44 and 45 thereof. As should be understood, tie rod apertures are operable to receive a tie rod, as will be described hereinafter therethrough, and which allow the first and second end plates 41 and 42, respectively, to be urged one towards the other in order to exert a compressive force on fuel cell module frames, which will be discussed in greater detail hereinafter. In this regard, the main body 43 of the first end plate 41 further has formed therein a fuel gas passageway which is generally indicated by the numeral 51, and a exhaust gas passageway generally indicated by the numeral 52. The fuel and exhaust gas passageways 51 and 52 extend between the inside and outside facing surfaces 44 and 45. The fuel gas passageway 51 allows the passage of a suitable fuel gas from a source 30 to be supplied to the proton exchange membrane fuel cell stack 40. The exhaust gas passageway allows an exhaust gas, which may include a combination of both unused fuel gas and water vapor, to escape in an efficient manner from the proton exchange membrane fuel cell stack 40. As seen in FIG. 4, the second end plate 42 similarly has a main body 53 which is defined by an inside facing surface 54, and an outside facing surface 55. The main body 53 of the second end plate 42 also has a peripheral edge 56. Located at predetermined locations about the peripheral edge 56 are tie rod apertures 57 which extend between the inside and outside facing surfaces 54 and 55, respectively. The tie rod apertures 57 are operable to receive suitable tie rods which will be discussed below.

As seen in FIG. 4, it will be appreciated that this form of the proton exchange membrane fuel cell stack 40 includes multiple tie rods generally indicated by the numeral 60. These multiple tie rods or couplers, in this form of the invention, include first, second, third and fourth tie rods 61, 62, 63 and 64, respectively. The multiple tie rods each have a first end 65 which is operable to engage the outside facing surface 55 of the second end plate 42, and an opposite, threaded, second end 66 which is operable to be engaged by a suitable nut 67 which lies in force transmitting engagement relative to the outside facing surface 45 of the first end plate 41. In the depicted form of the invention as seen in FIG. 4, it will be appreciated that the tie rods 60 are operable to be received through the tie rod apertures 50 and 57 of the first and second end plates 41 and 42, respectively. The tie rods 60 are also operable to be received through the multiple fuel cell stack module frames, which will be described in greater detail hereinafter. As will be appreciated, by tightening the nuts 67 relative to each of the respective tie rods 60, the first and second end plates 41 and 42 are drawn toward each other, and in combination, exert a compressive force of less than about 60 pounds per square inch to each of the respective fuel cell stack modules, as will be described in greater detail below. In an alternative form of the invention, and which is not illustrated, but will be appreciated from a study of FIG. 4, the individual tie rods or couplers 60 individually cooperate with, and connect, the respective first and second end plates 41 and 42 together. However, in this form of the invention, the individual first and second end plates 41 and 42 are somewhat enlarged from the view seen in FIG. 4. In this form of the invention, the multiple tie rods or couplers 60 do not pass through the respective fuel cell stack modules as will be described with respect to the form of the invention below, but rather are located exteriorly relative to the fuel cell stack modules. In this unillustrated form of the invention, the first and second end plates 41 and 42 still exert a compressive force of less than about 60 pounds per square inch to each of the respective fuel cell stack modules.

Figure 7:
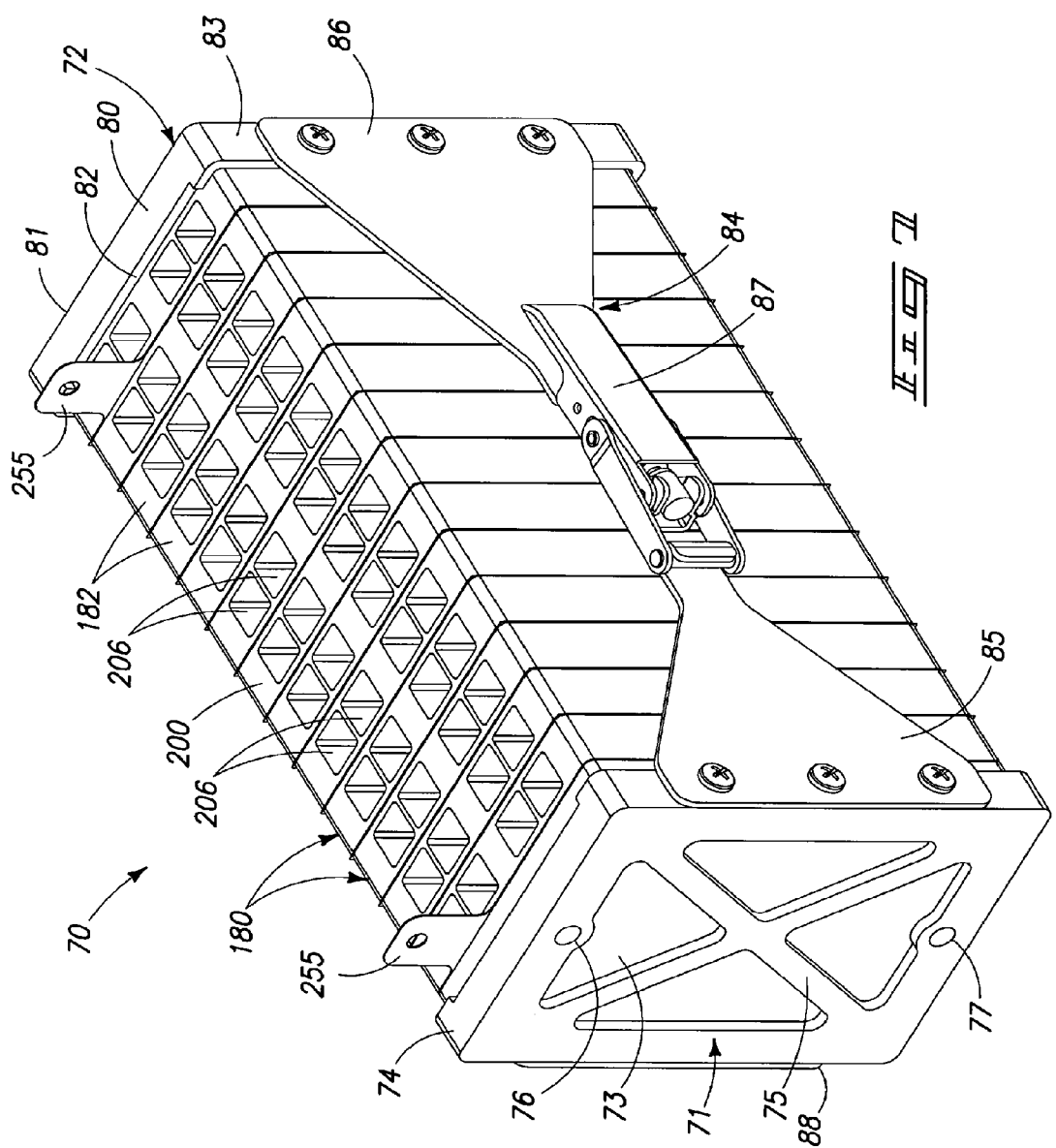
FIG. 7 is a perspective view of another form of a proton exchange membrane fuel cell stack of the present invention.

Referring now to FIG. 7, another form of the proton exchange membrane fuel cell stack is shown, and which is generally indicated by the numeral 70. In this form of the invention, the proton exchange membrane fuel cell stack 70 similarly has a first end plate 71, and a second end plate 72. As seen in that drawing, the first end plate has a main body 73 defined by a peripheral edge 74. Still further, the main body has an outside facing surface 75. As with the earlier form of the invention described, the main body 73 has a fuel gas passageway 76 and an exhaust gas passageway 77 formed therein. The fuel gas passageway 76 allows a source of a fuel gas 30 to be supplied to the proton exchange membrane fuel cell stack 70. The exhaust gas passageway 77 allows exhaust gases, which may include unused fuel gas as well as water vapor, to escape from this form of the invention 70. As seen in FIG. 7, the second end plate 72 has a main body 80. The main body has an outside facing surface 81, and an opposite inside facing surface 82. Still further, the main body 81 is defined by a peripheral edge 83. As illustrated in FIG. 7, a first releasable coupler 84 having a first end 85, and an opposite, second end 86, is individually affixed to the first and second end plates 71 and 72, respectively. A second and opposite coupler 88 may also be provided on the opposite side of the fuel cell stack 70 and is similarly affixed to the first and second end plates 71 and 72. The coupler 84 further has a moveable latch assembly 87 and which is operable, when fully engaged or closed, to cause the first and second end plates 71 and 72 to be forcibly moved together thereby exerting a compressive force on the individual fuel cell stack modules, as will be discussed in greater detail hereinafter, of less than about 60 pounds per square inch. As seen in the drawings, the coupler 84, having opposite ends 85 and 86, respectively, cooperates with, and forcibly connects the respective first and second end plates 71 and 72 together and does not pass through the respective fuel cell modules, as will be described below. This arrangement also facilitates the easy repair and replacement of individual fuel cell modules in the event of a malfunction or failure. Of course, this coupling arrangement greatly facilitates the servicing of fuel cell stacks in a manner not possible heretofore.

Figure 3:
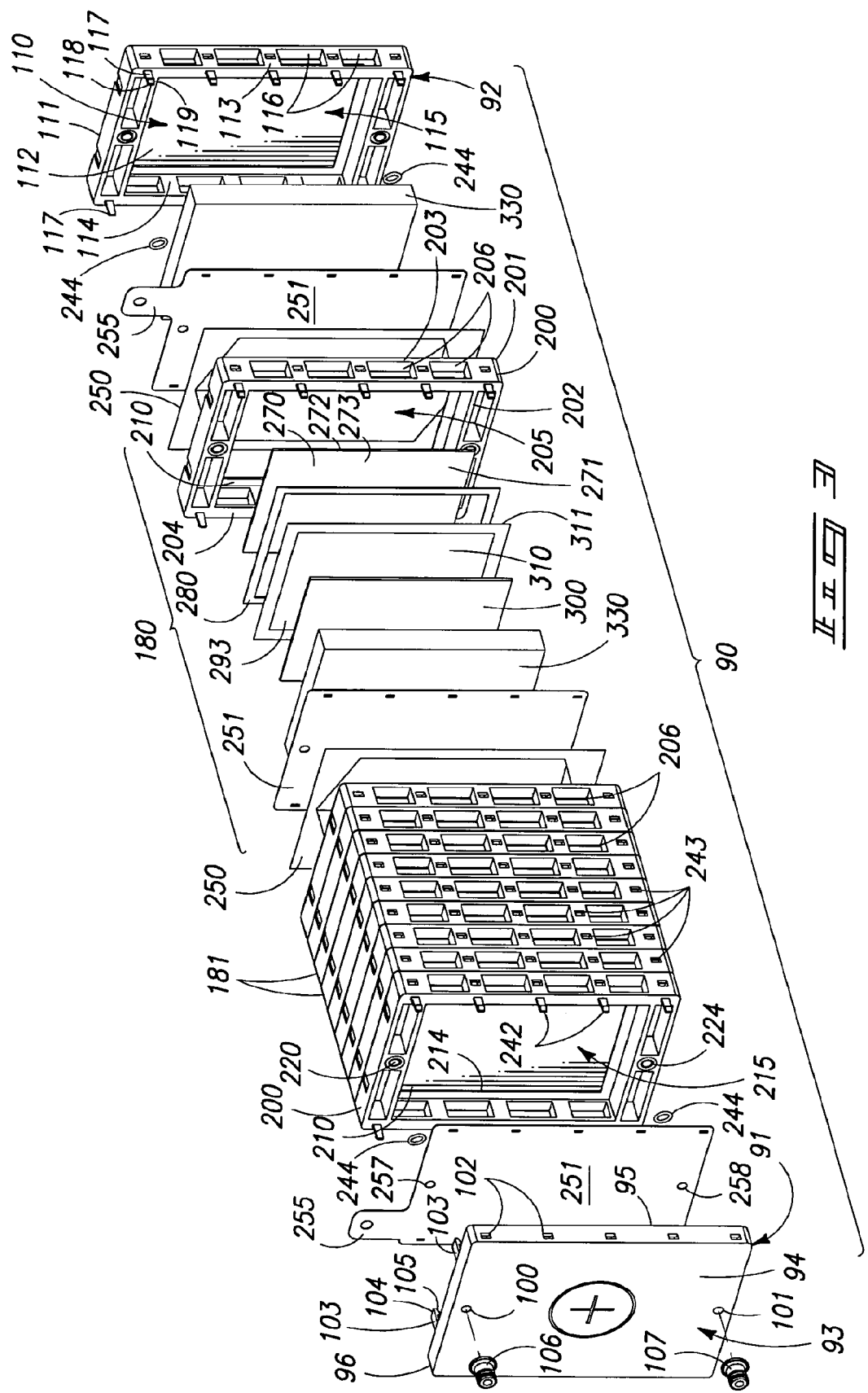
FIG. 3 is an exploded, perspective view of the form of the proton exchange membrane fuel cell stack as seen in FIG. 2.

Referring now to FIG. 3, another form of the present invention is shown and which is generally indicated by the numeral 90. As seen in this form of the invention, the proton exchange membrane fuel cell stack 90 has a first end plate 91, and an opposite second end plate 92. The first end plate has a main body 93 which is defined by an outside facing surface 94, and an opposite inside facing surface 95. Still further, the main body 93 is defined by a circumscribing peripheral edge 96. As illustrated, a fuel gas passageway 100 extends between the inside and outside facing surfaces 94 and 95 and provides a means by which a source of a fuel gas 30 may enter the fuel cell stack 90 through a fuel gas fitting 106. An exhaust gas passageway 101 also extends between the inside and outside facing surfaces 94 and 95 and provides a means by which any unused fuel gas and/or water vapor may exit the proton exchange membrane fuel cell stack 90 during operation through an exhaust gas fitting 107. As seen in this form of the invention, a plurality of fastener receiving apertures 102 are formed in the inside facing surface 95 and peripheral edge 96. These fastener receiving apertures 102 are operable to engage resilient fasteners which are borne by, and which extend outwardly relative to the respective proton exchange membrane fuel cell stack modules, as will be described below. Still further, and as seen in FIG. 3, the first end plate 91 includes a pair of resilient latch or fastener members 103 which extend normally outwardly relative to the inside facing surface 95, and which are mounted along the peripheral edge 96 of the main body 93. These individual fastener or latch members 103 have a distal end 104 which includes an engagement portion 105 which is operable to releasably engage an adjacent, juxtaposed fuel cell stack module, as will be described below, so as to exert a sufficient compressive force relative thereto in order to achieve the benefits of the present invention.

Referring still to FIG. 3, it will be seen that the second end plate 92 has a main body 110 which has an outside facing surface 111, and an opposite, inside facing surface 112. As illustrated in the exploded view of FIG. 3, the main body 110 is also defined by an outside peripheral edge 113, and an opposite inside peripheral edge 114. The inside peripheral edge 114 defines, at least in part, an internal cavity 115 which is operable to receive an electrically conductive heat sink, as will be discussed in greater detail hereinafter. Still further, as seen in FIG. 3, it should be understood that a plurality of air passageways 116 are formed in the main body 110, and extend therebetween the outside peripheral edge 113 and the inside peripheral edge 114. The plurality of air passageways 116 allow suitable cooling air to pass therethrough and engage the electrically conductive heat sink, discussed in detail hereinafter, which is received within the internal cavity 115 to accomplish the features of the invention. On the second end plate 92, and more specifically on the peripheral edge 113 of the inside facing surface 112 thereof, is mounted a plurality of resilient fasteners 117 which extend substantially normally, outwardly, relative thereto. The plurality of fasteners have a distal end 118 which forms an engagement portion 119 for engaging an adjacent fuel cell stack module, as will be described in greater detail hereinafter. The engagement of the plurality of resilient fasteners 117 with an adjacent fuel cell stack module, as will be described hereinafter, creates sufficient compressive force so as to achieve the several benefits of the invention as will be discussed in greater detail below.

Figure 12:
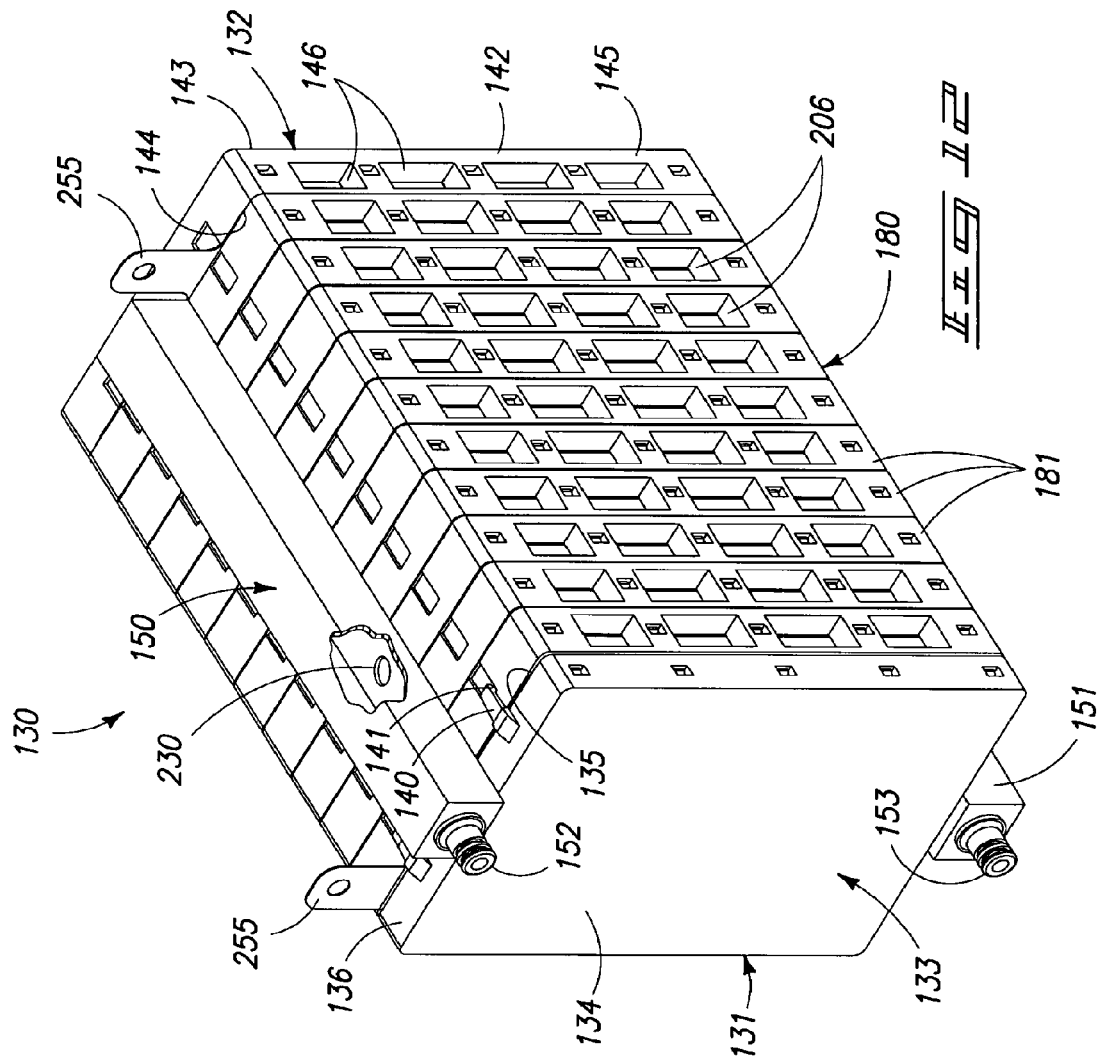
FIG. 12 is a perspective view of yet another form of a proton exchange membrane fuel cell stack which forms a feature of the present invention.

Referring now to FIG. 12, yet another alternative form of the proton exchange membrane fuel cell stack is shown, and which is generally indicated by the numeral 130. As seen therein, this form of the proton exchange membrane fuel cell stack has first and second end plates 131 and 132, respectively, and which are operable, as in the previous forms of the invention, to exert a compressive force on the fuel cell stack modules that will be described hereinafter in order to render the proton exchange membrane fuel cell stack 130 operational. In this form of the invention, the first end plate 131 has a main body 133 which has an outside facing surface 134, and an opposite inside facing surface 135. Still further, the main body 133 is defined by a circumscribing peripheral edge 136. As seen in FIG. 12, a plurality of resilient fasteners 140 are made integral with the peripheral edge 136 and which have a distal engagement portion 141 which resiliently releasably engages an adjacent fuel cell stack module, as will be described below, thereby releasably affixing the first end plate 131 in forcible engagement relative thereto. As further illustrated in FIG. 12, the second end plate 132 similarly has a main body 142, defined by an outside facing surface 143, and an opposite inside facing surface 144. It should be understood that the main body 142 is very similar in its overall design to that described with the earlier described form of the invention described in the paragraphs immediately above. In this form of the invention, the main body 142 has an outside peripheral edge 145 which similarly has formed therein a plurality of air passageways 146 which allow a source of cooling air to pass therethrough and come into heat removing contact relative to an electrically conductive heat sink, which will be described in detail in the paragraphs which follow. In the present form of the invention, and as seen in FIG. 12, it should be appreciated that a fuel gas manifold 150 is provided and which spans between the first and second end plates 131 and 132. The fuel gas manifold 150 is operable to deliver the source of a reactant fuel gas 30 to the respective fuel cell modules, through a fuel gas fitting 152, to render them individually operational in the manner, as will be described in greater detail below. Still further, in this form of the invention 130, an exhaust gas manifold 151 is provided and which is coupled in fluid receiving relation relative to the respective proton exchange membrane fuel cell stack modules, as will be discussed in greater detail hereinafter, to remove any unused fuel gas and/or water vapor through an exhaust gas fitting 153. In this form of the invention, as in the previous forms of the invention, it should be understood that the first and second end plates 131 and 132 are releasably fastened to the adjacent fuel cell stack modules which are positioned therebetween. This fastening arrangement generates a compressive force which is applied to the respective fuel cell stack modules, as described hereinafter, in order to render the PEM fuel cell stack 130 fully operational.

Referring now to FIG. 21, yet another, alternative form of the proton exchange membrane fuel cell stack is shown, and which is generally indicated by the numeral 160 therein. As seen in this form of the invention, the present invention includes first and second end plates 161 and 162 which operate in a manner similar to the end plates described in the previous forms of the invention discussed, above. In this regard, the first end plate 161 is defined by a main body 163 having an outside facing surface 164 and an opposite inside facing surface 165. The main body is also defined by an outside facing peripheral edge 166. As illustrated, a fuel gas passageway 170 and exhaust gas passageway 171 are formed in the main body 163, and extend therebetween the outside and inside facing surfaces 164 and 165, respectively. As earlier discussed, the fuel gas passageway is operable to deliver a source of a reactant fuel gas 30 to the fuel cell stack modules, as will be described below, in order to render the PEM fuel cell stack 160 operational. Similarly, the exhaust gas passageway 171 is operable to remove unused fuel gas and water vapor which may be produced as a byproduct of the operation of the PEM fuel cell stack 160, as will be described in greater detail in the operation phase of this application. Similar in some respects to other forms of the invention described above, a plurality of fastener receiving apertures 172 are formed in the inside facing surface 165, and peripheral edge 166 of the main body 163, and are operable to receive resilient fasteners which extend normally outwardly relative to the individual fuel cell stack modules that will be described below. As seen in FIG. 21, the second end plate 162 is also defined by a main body 173, and which has an outside facing surface and an opposite inside facing surface 175. As should be understood, the inside facing surface defines, at least in part, a cavity for receiving an electrically conductive heat sink (not shown). Still further, the main body has an outside facing peripheral edge 176 which has a plurality of air passageways 177 formed therein. The air passageways 177 allow a source of cooling air to reach, and come into heat removing relation relative to, an electrically conductive heat sink which is contained within the cavity which is defined, at least in part, by the inside facing surface 175. This is similar to the earlier form of the invention as seen in FIG. 3. Again this form of the invention 160 operates in a manner similar to the earlier forms of the invention discussed, above, whereby the individual first and second end plates 161 and 162 are fastened to adjacent fuel cell modules, as will be described below, in a fashion whereby a compressive force is generated in a manner which allows the proton exchange membrane fuel cell stack 160 to be rendered fully operational.

Figure 2:
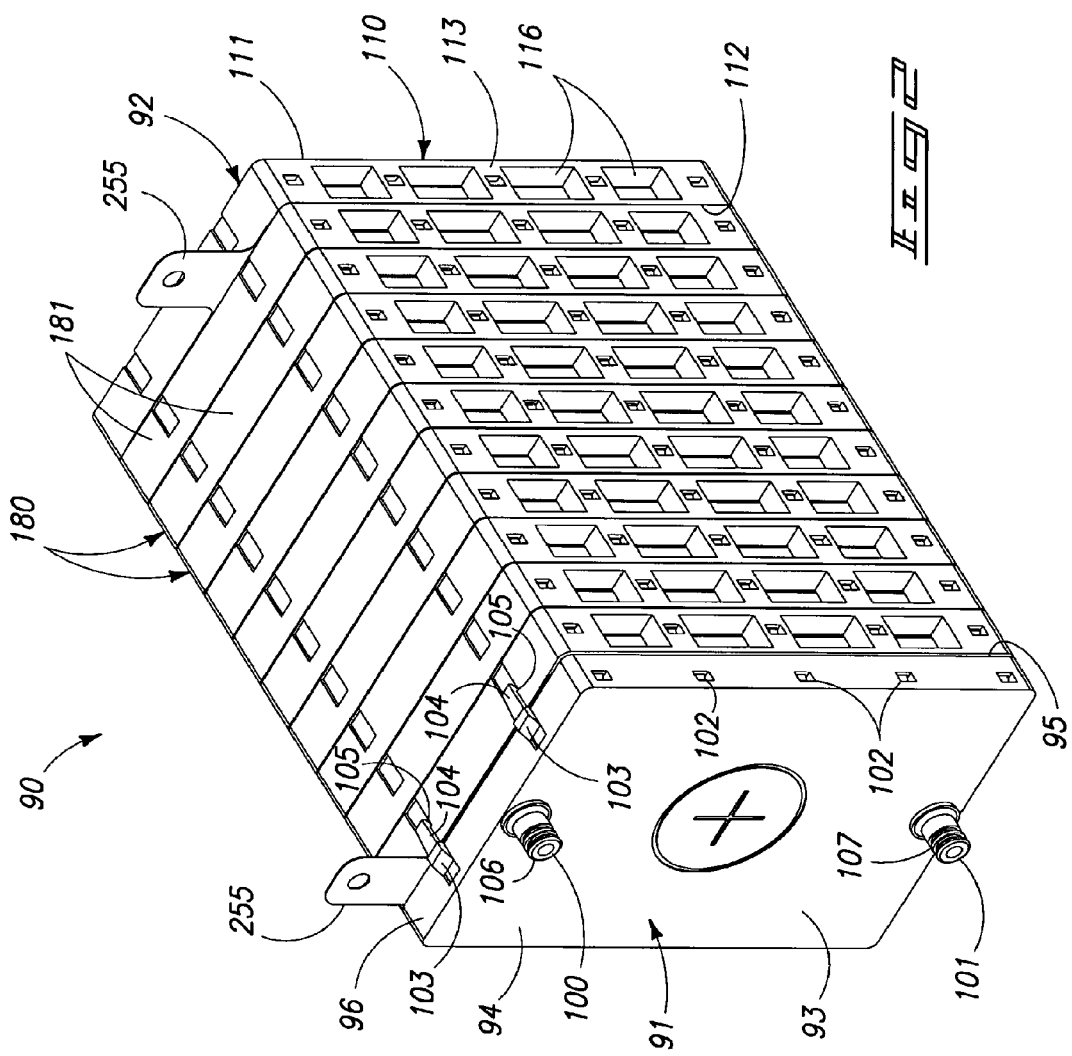
FIG. 2 is a perspective view of one form of a proton exchange membrane fuel cell stack of the present invention.
Figure 5:
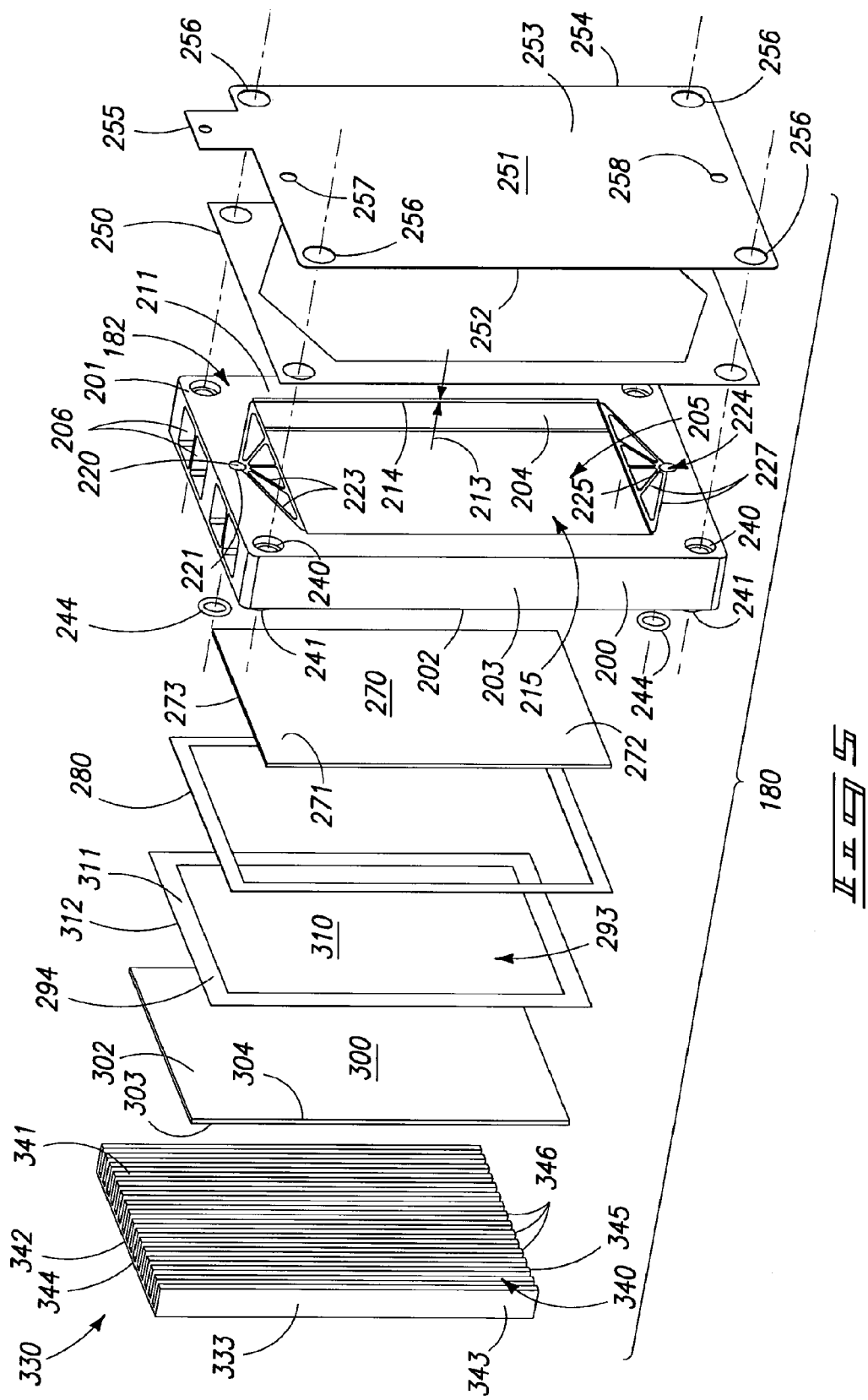
FIG. 5 is a fragmentary, exploded, perspective view of one form of a proton exchange membrane fuel cell stack module, which forms a feature of the present invention.
Figure 8:
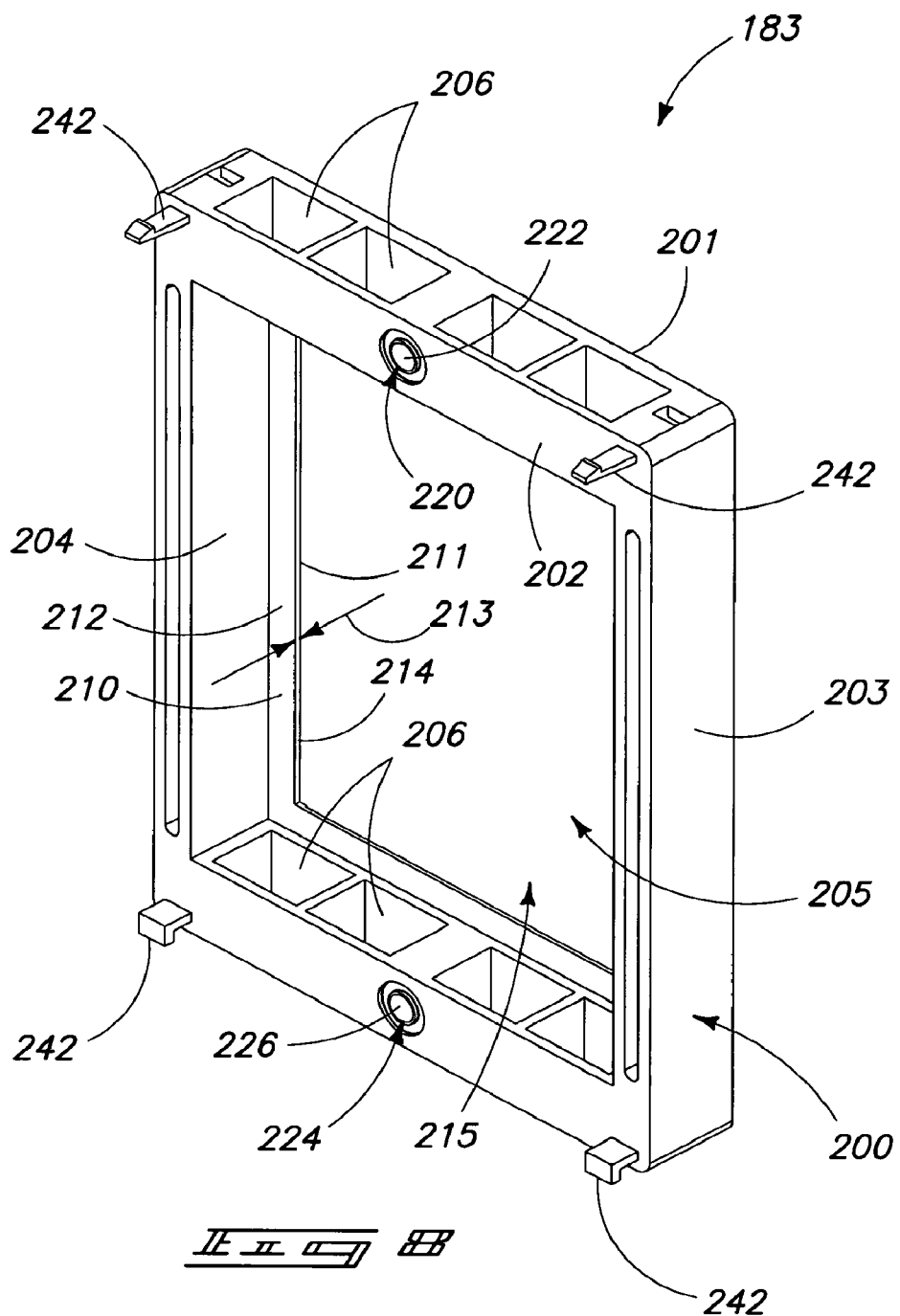
FIG. 8 is a perspective, side elevation view of one form of a proton exchange membrane fuel cell stack module frame which forms a feature of the present invention.
Figure 9:
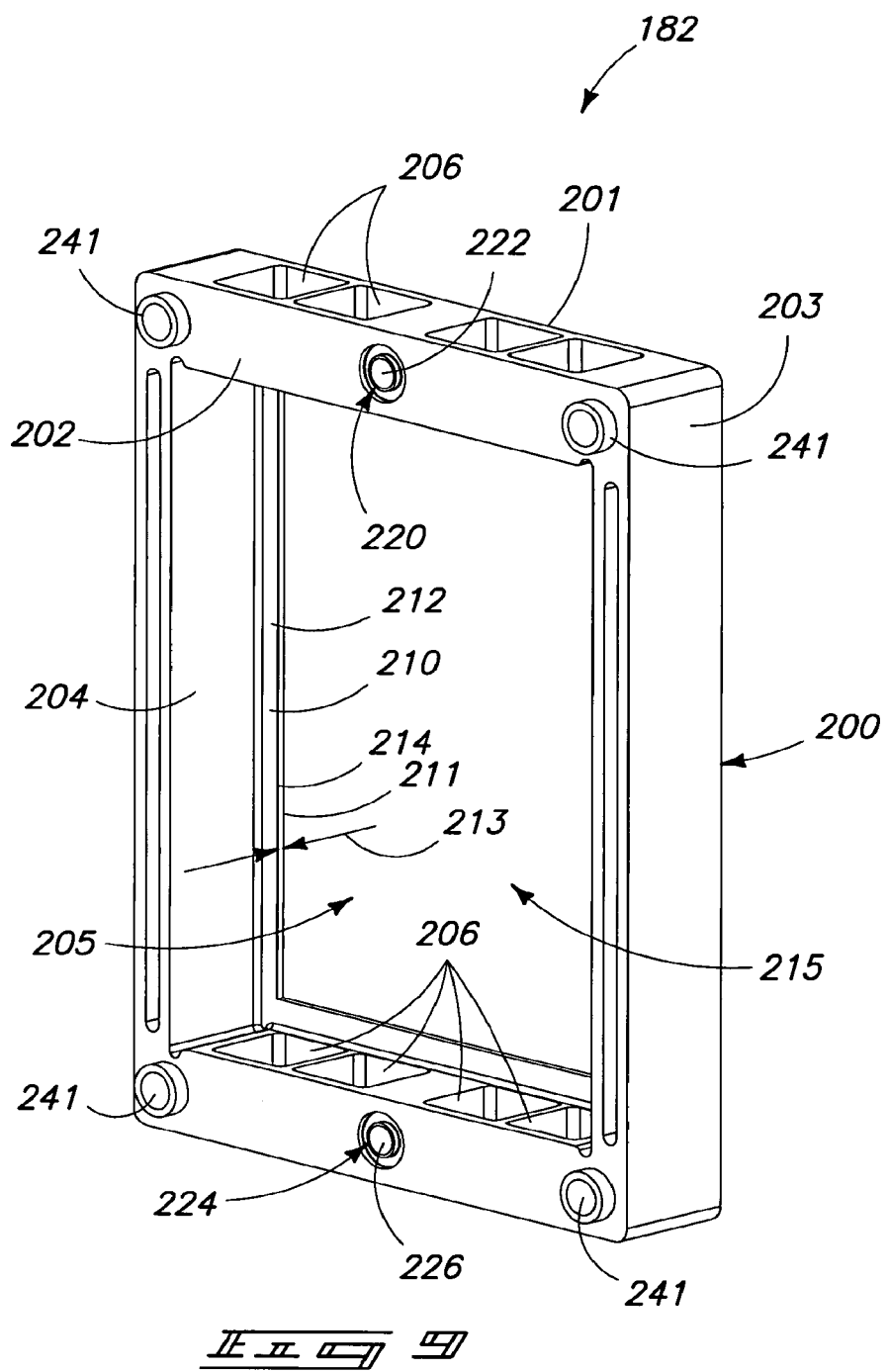
FIG. 9 is a perspective, side elevation view of another form of a proton exchange membrane fuel cell stack module frame which forms a feature of the present invention.
Figure 10:
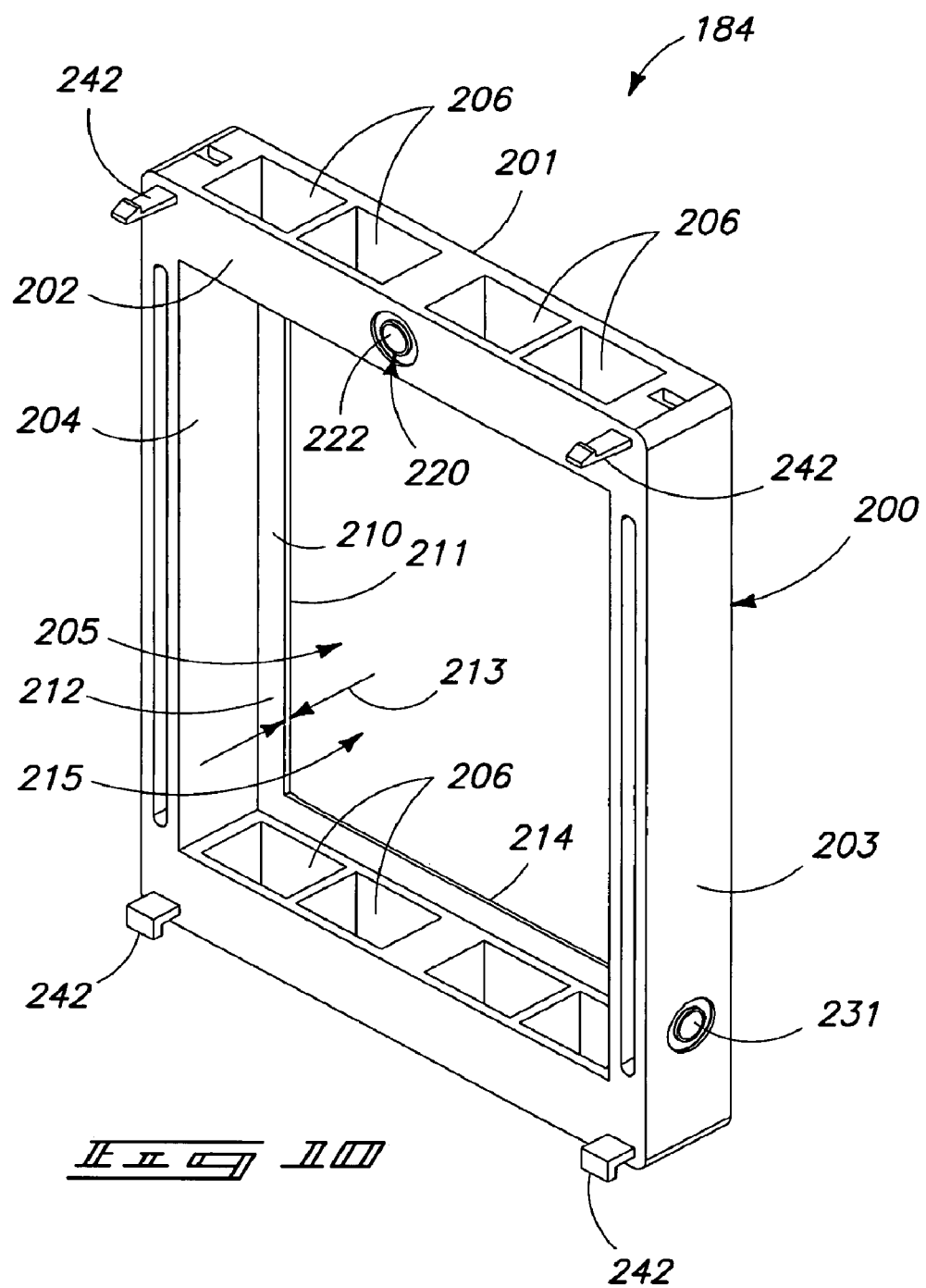
FIG. 10 is a perspective, side elevation view of yet another form of a proton exchange membrane fuel cell stack module frame which forms a feature of the present invention.

Referring now to FIG. 2 and following, it will be understood that a proton exchange membrane fuel cell stack in the various forms 40, 70, 90, 130, 160, as already identified, and which may be incorporated in a PEM fuel cell stack power system 10, includes a plurality of repeating, serially electrically coupled fuel cell stack modules which are generally indicated by the numeral 180. The plurality of fuel cell stack modules 180 are disposed between the first and second endplates 41 and 42; 71 and 72; 91 and 92; 131 and 132; and 161 and 162, discussed heretofore, and are sealably mounted together by a compressive force of less than about 60 pounds per square inch. This compressive force may be applied by means of the various end plates 41 and 42; 71 and 72; 91 and 92; 131 and 132; and 161 and 162, as well as coupler assemblies, such as the multiple tie rods 60 and the releasable coupler 84. Still further, other fastening arrangements as will be described below will also generate the compressive force. It should be understood that each of the fuel cell stack modules 180 comprise a frame. In this regard, the invention contemplates at least five different proton exchange membrane stack module frames, which will be referred to hereinafter as merely a "frame." In this regard, the respective frames include a first form 181, as best seen in FIG. 3; a second form 182, as best seen in FIGS. 5 and 9; a third form 183, as best seen in FIG. 8; a fourth form 184, as best seen in FIG. 10; and a fifth form 185, as best seen in FIG. 21. In the paragraphs which follow, it should be understood that like numbers refer to like structures in the individual frame forms 181-185, respectively. It will be appreciated from the discussion which follows that the respective frame forms have subtle variations which provide advantages to the various forms of the invention as described. These features will be discussed in greater detail in the paragraphs which follow. In this form of the invention, each of the respective frames are fabricated from a thermoplastic injection moldable plastic, although other materials may be suitable.

The respective proton exchange membrane fuel cell stack frames, in their various forms 181-185, respectively, are shown in FIGS. 8-10. With respect to the various forms of the frames 181-185 respectively, it will be appreciated that the respective frames 181-185 each have a main body 200. The main body 200 is defined by a first side 201, and an opposite second side 202. The first and second sides are disposed in predetermined spaced relation by an outside peripheral edge 203 which has a given width dimension. Still further, the main body 200 has an inside peripheral edge 204 which defines an internal cavity 205. As best seen by reference to FIG. 2, and following, it will be appreciated that an air passageway 206 is formed in the peripheral edge 203, and extends between the inside and outside peripheral edges 203 and 204, respectively. This air passageway 206 communicates with the internal cavity 205 thereof. It should be understood from studying the various forms of the frames 181-185, that the frames are substantially self-aligning as will be described in greater detail hereinafter. This feature of the invention greatly facilitates the effective assembly of the same invention.

The various forms of the frame 181-185, respectively, each have a mounting flange 210 which is made integral with the inside peripheral edge 204 of the main body 200, and which extends into the internal cavity of the frame 205. The mounting flange 210 has a first side 211 which is disposed in a substantially coplanar orientation relative to the first side of the frame 201, and a second side 212. A thickness dimension 213 (FIG. 5) is defined between the first side 211 and the second side 212 of the mounting flange 210. Still further, the mounting flange defines an inside peripheral edge 214 (FIG. 3) which defines an aperture 215 which communicates with the internal cavity 205 of the frame 180. Each of the several forms of the frames 181-185, respectively, have formed therein a fuel gas passageway 220 which extends through the respective main body 200 of the frame 180 and communicates with the internal cavity of the frame 205. In this regard, the respective fuel gas passageways 220 have a first end 221 (FIG. 5) which is coupled in fluid flowing communication relative to the fuel gas passageway 51, 76, 100, 170, as defined by the end plates 41, 42, 71, 72, 91, 92, 131, 132, 161, 162, of the various forms of the invention 40, 70, 90, and 160, described earlier. Therefore, a source of a reactant fuel gas 30 provided to the fuel gas passageways as defined by an end plate of the various forms of the invention would thereby pass through the end plates and travel along the substantially coaxially aligned fuel gas passageway 220 formed in the frames 180, and be received within the internal cavity of the frame 205. As should be understood, and in one form of the invention, the second end 222 of the fuel gas passageway 220 of a respective frame 181-185 is positioned in fluid flowing relation relative to the first end 221 of a fuel gas passageway 220 of an adjacent frame. Still further, and as best seen in the drawings, a plurality of fuel gas channels 223 (FIG. 5) are formed in the first side 201 of the main body 200, and which couple the fuel gas passageway 220 in fluid flowing relation relative to the internal cavity 205 of the frame 181-185 and to the aperture 215 which is defined by the inside peripheral edge 214 of the mounting flange 210. Still further, it will be recognized by a study of the drawings such as FIG. 5, that the first side 201 of the main body 200 further has formed therein an exhaust gas passageway 224 which has a first end 225 and an opposite second end 226. Similar to that discussed above, the first end 225 of the exhaust gas passageway 224 is coupled in fluid flowing relation relative to the exhaust gas passageway 52, 77, 101, 171, as defined in the respective end plates 41, 71, 91, 131, 161, as earlier disclosed. Similarly, the second end 226 is coupled in fluid flowing relation relative to the first end 225 of an adjacent main body 200. It will be seen in FIG. 5 that a plurality of exhaust gas channels 227 are formed in the first side 201 of the main body 200 thereby coupling the internal cavity 205 and the aperture 215 in fluid flowing relation relative to the exhaust gas passageway 224. As will be appreciated, the fuel gas 220 and exhaust gas passageways 224 of the respective fuel cell stack modules 180 are coupled in fluid flowing relation one relative to the other in one possible form of the invention.

Referring now to FIG. 12, it should be understood that in the form 130 of the invention as seen therein, a fuel gas passageway 230 may alternatively be formed in the outside peripheral edge 203 of a frame 180 so as to be coupled in fluid flowing relation relative to a fuel gas manifold 150. Similarly, an exhaust gas passageway (not shown) may be alternatively formed in the outside peripheral edge 203 of a frame 180 so as to be coupled in fluid flowing relation relative to an exhaust gas manifold 151. Referring now to FIG. 10, and in another alternative form of the invention, an exhaust gas passageway 231 may be formed in the outside peripheral edge 203 of the frame 180 in a manner such that the exhaust gasses formed by the proton exchange membrane fuel cell stack, and which may include unused fuel gas and water vapor formed as a byproduct of the operation of the fuel cell stack, may be vented to the ambient environment. In one possible form of the invention 40 as seen in FIG. 4, one of the frames 180 which is positioned adjacent to the first end plate 41 does not include the aperture 215. Rather, the first side 201 of the frame 180 is substantially continuous and is forcibly engaged by the adjacent end plate. This is similarly the case for the form of the invention 90 as seen in FIG. 3, and wherein the second end plate 92, and which appears quite similar to the frames 180 that are positioned therebetween. The first and second end plates 91 and 92 has a substantially continuous outside facing surface 94 and does not define an aperture 215 which communicates with the internal cavity 115 thereof.

Figure 11:
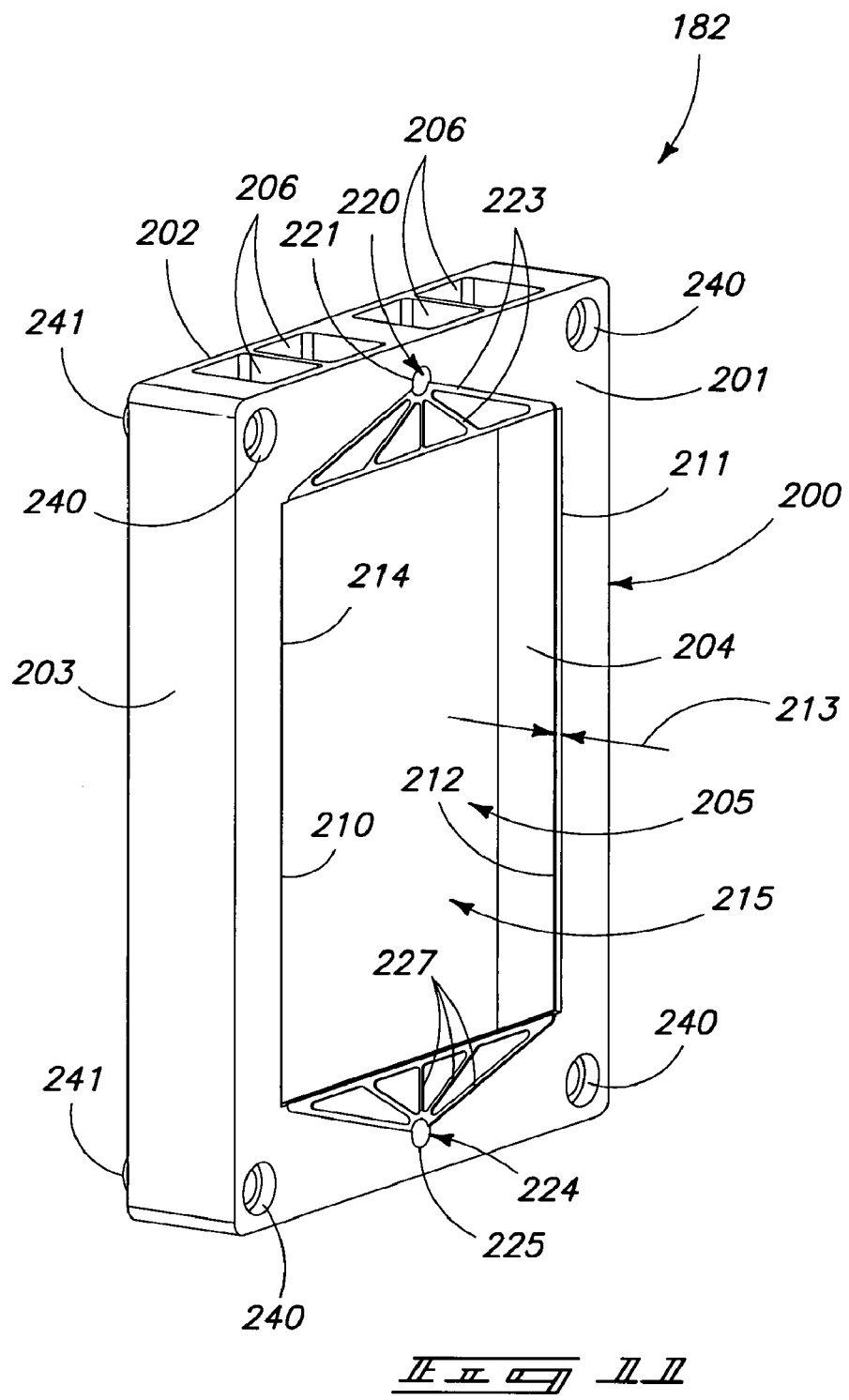
FIG. 11 is a second perspective, side elevation view of the proton exchange membrane fuel cell stack module frame, and which is taken from a position opposite to that seen in FIG. 9.

As best seen by reference to FIGS. 9 and 11, for example, and in one form of the invention, the various forms of the frames 181-185 may include a plurality of alignment cavities 240 (FIG. 11) which are formed in predetermined positions in the first side 201 of the frame 180 and which are operable to matingly receive or nest a plurality of male alignment members 241 which are borne on, and otherwise extend outwardly relative to, the second side 202 of an adjacent frame 180 which is juxtaposed relative thereto. As should be understood, a passageway may, but does need to, extend through and between 241 and 242 (not shown). The first male alignment member 241 is operable to be received or matingly nested within the individual alignment cavities 240 in the nature of a friction-fit. This telescoping receipt of the male alignment member within the individual alignment cavities 240 facilitates the self-alignment of the respective frames 181-185 one relative to the other. This greatly facilitates the accurate and rapid assembly of the individual proton exchange membrane fuel cell stacks 40, 70, 90, 130 and 160, as described herein. It will be recognized that O-ring seals 244, are employed in order to seal the respective fuel gas passageways 220 and exhaust gas passageways 224 of adjacent fuel cell stack modules together. In some forms of the invention, as seen in FIG. 4, for example, the plurality of tie rods or couplers 61-64, respectively, are received through the individually coaxially aligned alignment cavities and male alignment members so as to allow the end plates 41 and 42 of the specific form of the proton exchange membrane fuel cell stack 40 to be forcibly joined or coupled together. In an alternative form of the invention 90 as seen in FIG. 3, the earlier mentioned alignment cavities 240 and male alignment members 241 are eliminated in favor of a plurality of resilient fasteners 242 which are mounted on, and extend normally outwardly relative to, the second side 202 of the main body 200. The plurality of resilient fasteners 242 are individually coaxially aligned so as to be received within a plurality of fastener receiving apertures 243 which are formed in the first side 201 of the main body 200 of an adjacent frame 181-185 in the nature of a snap-fit. The individual resilient fasteners 242 may be accessed so as to release an adjacent fuel cell module by means of a plurality of fastener receiving apertures 243 which extend, in part, through the outside peripheral edge 203 as seen in FIG. 3. When this form of the invention is utilized, the individual frames 181-185 may be assembled in a fashion whereby an appropriate amount of force is exerted by the individual frames 180, one relative to another, so as to achieve the benefits of the present invention, and without the use of couplers such as described with some forms of the invention. Therefore, the plurality of resilient fasteners 242 and fastener receiving apertures 243 in combination provide the same self-alignment features for the respective frames 180 when they are oriented in an operational relationship one relative to the other, and are further operable to engage a fastener receiving apertures 243 of an adjacent frame so as to provide an appropriate mating relationship so as to achieve the benefits of the present invention.

Referring now to FIG. 21, it will be understood by comparing that view with that of FIG. 3, that in this form 185 of the frame 180 that the number and cross-sectional areas of the respective air passageways 206, as defined by the main body 200 may be varied so as to achieve an operationally effective heat dissipation from the proton exchange membrane fuel cell stack 160 during operation. In the present form of the invention 160 as seen in FIG. 21, as well as the other forms of the invention as seen in the drawings, it should be understood that the proton exchange membrane fuel cell stack 160 has an operationally effective temperature when the most optimal amount of electrical power is generated by the PEM fuel cell stack 160 during operation. In the present invention as disclosed, the individual proton exchange membrane fuel cell modules 180 are each maintained at an operational temperature which is within less than about 10% relative to any other fuel cell modules 180 as contained within the same proton exchange membrane fuel cell stack 40, 70, 90, 130 and 160.

Referring now to FIG. 3 and following, each of the proton exchange membrane modules 180, as disclosed herein, includes a sealing member 250 which is sealably affixed to the first side 201 of each of the main bodies 200 of the frames 181-185, and which is positioned adjacent to the outside peripheral edge 203 thereof. Positioned in substantially sealing relation and in alignment relative to the individual frames 181-185, respectively, is a current collecting separator plate generally indicated by the numeral 251. The current collecting separator plate 251 is generally a non-porous, substantially smooth plate normally fabricated from an electrically conductive metal. The current collecting separator plate 251, which matingly cooperates with and is substantially self-aligning relative to the respective frames 181-185, has a first inside facing surface 252, and an opposite second, outside facing surface 253. When appropriately positioned relative to the first side 201 of the main body 200, the inside facing surface 252 is disposed in covering relation relative to and substantially seals the respective (and exemplary) fuel gas channels 223 and exhaust gas channels 227 (FIG. 11), respectively, thereby confining the reactant or fuel gas 30, and any unused reactant gas and/or water vapor to those channel regions 223, 221. As seen in the drawings, the current collecting separator plate 251 is defined by a peripheral edge 254 and in some forms of the invention, the current collecting separator plate has an electrically conductive tab 255 which extends outwardly relative to the outside peripheral edge 203 of the main body 200 of each of the frames 181-185 for purposes of allowing the removal of electricity, or further allowing an electrical signal to be transmitted from same. This would, for example, allow the invention to be monitored by a digital control system 15 as seen in FIG. 1. In other forms of the invention, electrically conductive tabs 255 on one more current collecting separator plates 251 may be used to electrically segment the fuel cell stack 40, 70, 90, 130 160 as taught in U.S. Pat. No. 6,703,155, which is incorporated by reference herein. In one form of the invention as seen in FIG. 5, a plurality of alignment apertures 256 may be formed along the peripheral edge 252 so as to accommodate either male alignment members 241; or a plurality of resilient fasteners 242 of an adjacent frame 181-185 to pass therethrough. In some forms of the invention, the same current collecting separator plate 251 will have both a fuel gas passageway 257, as well as an exhaust gas passageway 258 formed therein, and which will be substantially coaxially aligned relative to the fuel and exhaust gas passageway 220 and 224 formed in the adjacent main body 200.

Each of the proton exchange membrane fuel cell modules 180 include and enclose, in an appropriate orientation, a first porous gas diffusion layer which is generally indicated by the numeral 270. In one possible form of the invention, the first gas diffusion layer comprises, at least in part, a porous electrically conductive ceramic material layer which is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof. The porous electrically conductive ceramic material which is typically selected has an electrical resistivity of less than about 60 micro-ohm-centimeters, has a permeability that lies in a range of greater than about 5 Gurley-seconds to less than about 2000 Gurley-seconds, and further has a pore size of about 0.5 to about 200 microns. Additionally, the first porous gas diffusion layer 270 has a main body 271 which has an outside facing surface 272 which is positioned in a substantially coplanar orientation relative to the first side 201 of the main body 200, and a second, inside facing surface 273. As should be understood, the main body 271 has a thickness dimension approximately equal to the thickness dimension 213 as defined between the first and second sides 211 and 212 of the mounting flange 210. Still further, the main body 271 is sized so as to substantially occlude the aperture 215 which is defined by the inside peripheral edge 214 of the mounting flange 210. It is recognized that the fuel gas channels 223 formed on the first side 201 of the frame 181-185, as discussed above, deliver a source of fuel gas 30 to the first gas diffusion layer 270. The outside facing surface 272 of the first porous electrically conductive gas diffusion layer 270 is placed into ohmic electrical contact thereagainst the inside facing surface 252 of the current collecting separator plate 251, which is sealably mounted on the first side 201.

Figure 6:
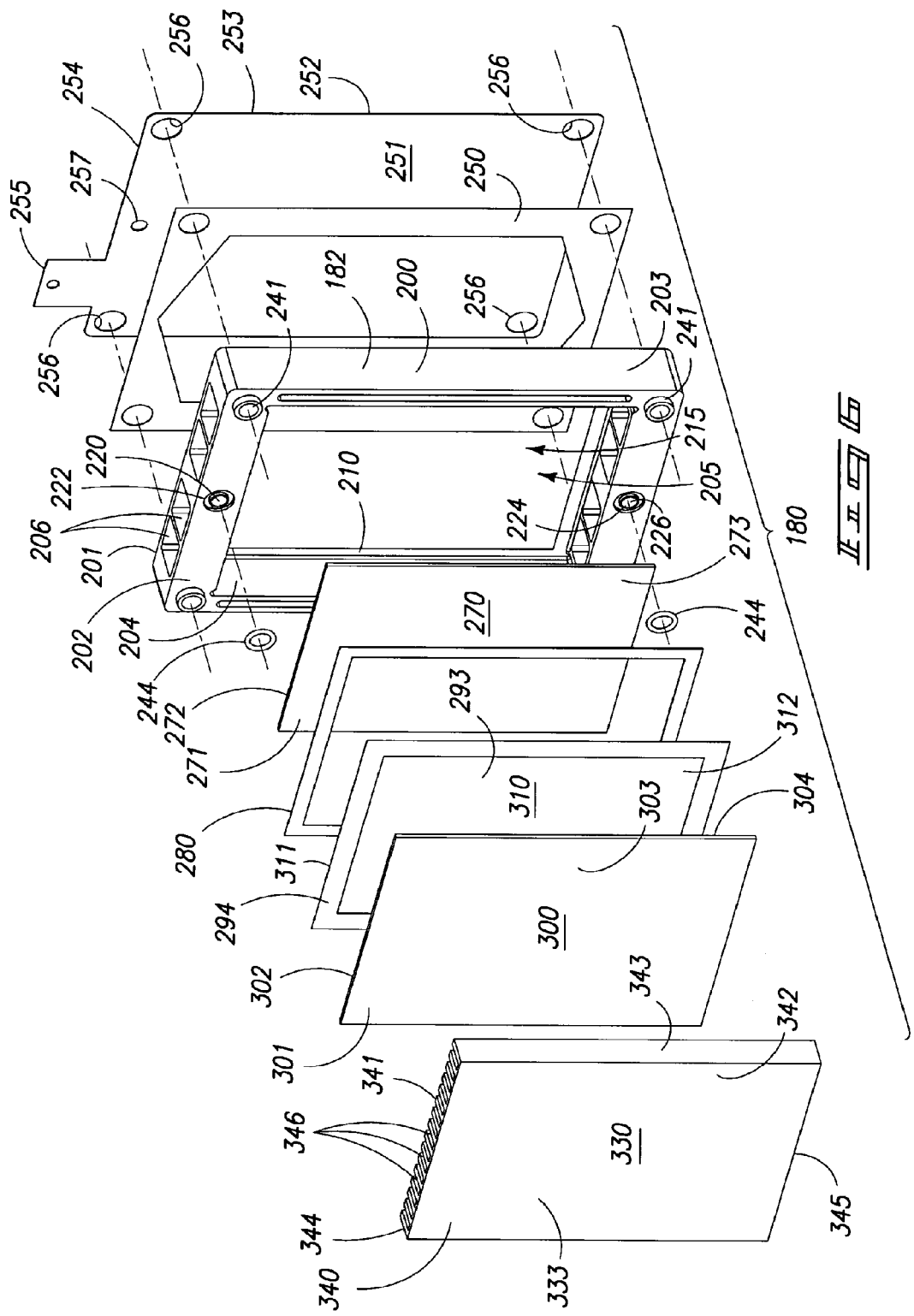
FIG. 6 is a fragmentary, exploded, perspective view of the same proton exchange membrane fuel cell stack module taken from a position opposite to that seen in FIG. 5, and which forms a feature of the present invention.

Referring now to FIG. 6, the present invention includes a circumscribing anode seal 280, which is received within the internal cavity of the frame 205, and which is fitted thereaolong, and rests in sealable contact thereagainst the second side 212 of the mounting flange 210. The anode seal 280 may be formed from a pressure sensitive adhesive, or other means of sealing and bonding, the shape of which will generally follow that of the second side 212 of the mounting flange 210.

As shown in FIGS. 3-6, the present invention also includes a PEM membrane electrode assembly (MEA) which is generally indicated by the numeral 310. The PEM MEA is well known in the art and further discussion regarding its composition and operation is not warranted other than to note that PEM fuel cells normally have an operational temperature which is less than about 200 degrees C. Further, one skilled in the art will readily recognize that the PEM MEA generates water as a byproduct during operation. It has long been known that some amount of water must be present to render the MEA fully operational. Further, if too much water is present, the MEA will not operate optimally. As shown in FIG. 23, the MEA comprises a proton exchange membrane 290 which has a first anode side 291, and has an opposite, second cathode side 292. Still further, the MEA is defined by an active area which is generally indicated by the numeral 293. An anode electrode catalyst layer 295 is applied to the active area 293 of the anode side 291 of the membrane 290. A cathode electrode catalyst layer 296 is applied to the active area 293 of the cathode side 292 of the membrane 290. The possible compositions of these electrode catalyst layers 295 and 296 are well known in the art, and the relative compositions of the anode and cathode electrode catalyst layers may differ. Also, as shown in FIGS. 3-7, the MEA also includes a peripheral edge 294 which is outside of the active area 293 and which sealably rests thereagainst the anode seal 280 and thereby sealably secures the MEA or the proton exchange membrane to the mounting flange 210. The compressive force of less than about 60 pounds per square inch that is applied to each of the fuel cell stack modules 180, as disclosed above, applies a proton exchange membrane sealing force to the mounting flange 210, against the anode seal 280, which lies in a range of about 5 to about 50 pounds per square inch.

Figure 25:
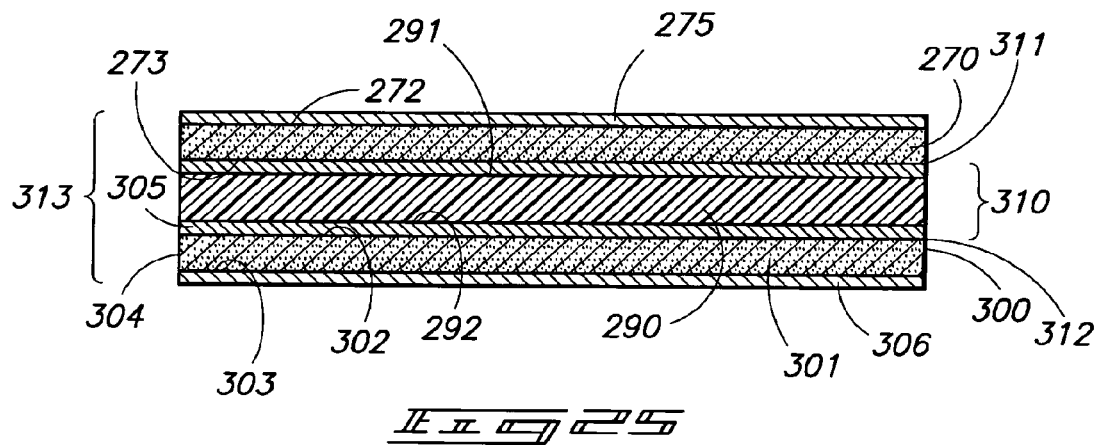
FIG. 25 is a greatly enlarged, transverse, vertical sectional view of a proton exchange membrane electrode assembly having a gas diffusion layer which has a metalized coating applied thereto, and which forms a feature of the present invention.
Figure 26:
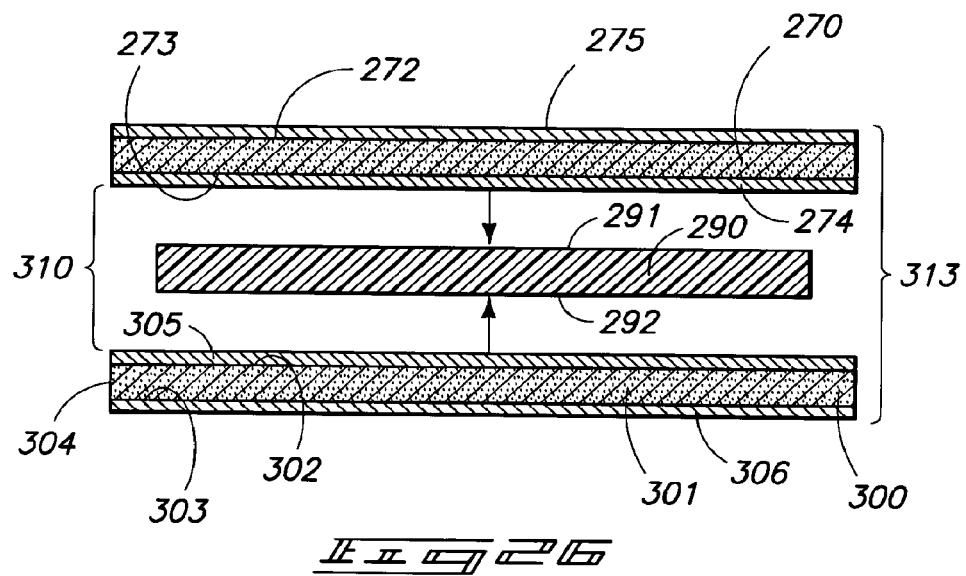
FIG. 26 is a greatly enlarged, exploded, transverse, vertical sectional view of the arrangement as seen in FIG. 25.

In some forms of the invention, the first porous electrically conductive gas diffusion layer 270 may be a porous carbon layer or plate. Still further, in another possible form of the invention as seen in FIGS. 25 and 26, the first porous electrically conductive gas diffusion layer 270 may further include a porous metalized layer 275 which is applied to the second outside facing surface 272. Such a layer is disclosed in U.S. Pat. No. 6,716,549, the teachings of which are incorporated by reference herein. In this regard, this porous metal coating or layer 275 is selected from the group of metals consisting essentially of aluminum, titanium, nickel, iron, stainless steel, manganese, zinc, chromium, copper, zirconium, silver, and tungsten, and their alloys, nitrides, oxides, and carbides. In the form of the invention shown in FIG. 25, the first gas diffusion layer 270 with the metal coating 275 is juxtaposed relative to the anode side 311 of the MEA 310. The metal coating 275 allows the porous gas diffusion layer 270 to make an effective ohmic electrical contact therewith the current collecting separator plate 251.

In one possible form of the invention as seen in FIG. 22, the first porous electrically conductive gas diffusion layer 270 may include an electrode or catalyst layer 274 which is bonded or applied to a surface thereof, here illustrated as the first inside facing surface 273. In this case, the anode side 291 of a proton exchange membrane 290 is then juxtaposed relative to the catalyst layer 274, which is bonded or applied to the first conductive gas diffusion layer 270. Likewise, in the form of the invention as seen in FIG. 26, a catalyst layer 274 is applied to one surface of the porous gas diffusion layer 270 upon which a porous metal coating 275 is applied to the opposite surface therefore. The anode side 291 of a proton exchange membrane 290 is then juxtaposed relative to the catalyst layer 274.

Referring now to FIG. 3 and following, it will be understood that the respective fuel cell stack modules 180 further include a second gas diffusion layer which is generally indicated by the numeral 300, and which is positioned within the internal cavity 205 of the respective frames 181-185, and which is juxtaposed relative to the cathode side 312 of the proton exchange membrane 310. The second gas diffusion layer 300 is typically fabricated from an electrically conductive ceramic material which may be similar to that formed of the first porous gas diffusion layer 270, although the compositions of the first and second gas diffusion layers 270 and 300 may differ. The second gas diffusion layer 300 has a main body 301 which has a first inside facing surface 302, which lies in juxtaposed relation relative to the cathode side 312 of the MEA 310; and an opposite, second or outside facing surface 303. Still further, the main body is defined by a peripheral edge 304. As seen in FIGS. 22 and 26, in some forms of the invention, a catalyst layer 305 may be first applied to the inside facing surface 302. Thereafter, the proton exchange membrane 290 may be bonded therebetween the first gas diffusion layer 270 and the second gas diffusion layer 300. In the form of the invention as seen in FIG. 23, the proton exchange membrane 290 has catalyst layer 295 applied to the opposite anode and cathode sides thereof 291 and 292, and thereafter the first and second porous gas diffusion layers 270 and 300 may be bonded to same. FIG. 24 shows another form of the invention and wherein the second porous gas diffusion layer 300 has a larger size than that of the first porous electrically conductive ceramic gas diffusion layer 270. In this case, the size of the second gas diffusion layer 300 is such that if fully occludes the internal cavity 205 of the frame 181-185, whereas the first gas diffusion layer 270 is sized to fully occlude the smaller aperture 215 defined by the inner peripheral edge 214 of the MEA mounting flange 210.

In still another possible form of the invention as best seen in FIGS. 25 and 26, the porous electrically conductive ceramic gas diffusion layers 270 and 300, respectively are coated with individual catalyst layers 305, and a porous metal coating 275 and 306, respectively. The metal coating 306 is similar to that earlier disclosed with respect to the coating or metalized layer 275 which is applied to the first ceramic electrically conductive layer 270. When assembled, the proton exchange membrane 290 in combination with the catalyst layers which are positioned adjacent thereto comprises a membrane electrode assembly 310 which is then received within the internal cavity 205 of the respective frames 200. When fully assembled, the first and second gas diffusion layers 270 and 300, respectively, lie in ohmic electrical contact thereagainst the opposite anode and cathode sides 291 and 292, respectively of the proton exchange membrane 290.

As noted earlier during operation of a PEM fuel cell, water is produced as a byproduct. In previous prior art devices, various schemes and arrangements have been devised so as to effectively manage the water which is produced by the proton exchange membrane so as to provide optimal electrical output from any resulting fuel cell. One arrangement which has been employed heretofore was to provide various coatings of material to the gas diffusion layer positioned on the anode or cathode side of an MEA so as to give the gas diffusion layer a greater or lesser degree of hydrophobicity. By doing so, designers have attempted to retain a sufficient amount of water in the proton exchange membrane so as to maximize the operation of the fuel cell. Regardless of the schemes and methodology employed heretofore, gas diffusion layers have been designed so as to retain just enough water to maintain the membrane in an optimally hydrated state, and while simultaneously removing excessive water from the membrane so as to prevent the membrane from flooding with water and shutting down the electricity production of the fuel cell.

In the arrangement as discussed in the present application, it should be understood that the porous electrically conductive ceramic gas diffusion layers 270 and 300 are fabricated from porous ceramic materials which are generally characterized as hydrophilic materials, that is they have an affinity for adsorbing, absorbing, or passing water. In view of the hydrophilic nature of these materials, it was expected that water management issues would result from the use of porous electrically conductive ceramic material. Through a mechanism which is not completely understood, it was surprisingly discovered that these same porous, ceramic materials employed in, for example, the first and second gas diffusion layers 270 and 300, somehow retain enough water so as to maintain the proton exchange membrane 290 optimally hydrated while simultaneously allowing gas to pass therethrough. The retention of some amount of water by the porous electrically conductive ceramic gas diffusion layers 270 and 300 to render a fuel cell operational is quite novel and unexpected in view of the manner in which ceramic materials have been utilized heretofore in solid oxide fuel cells (SOFC). Moreover, initial testing of the present invention with ceramic anode and cathode gas diffusion layers has shown an unexpected increase in the operating temperature range. While an identical PEM membrane with carbon gas diffusion layers would have a maximum operating temperature of approximately 46° C., the same membrane with ceramic gas diffusion layers can operate up to 54° C. without thermal runaway caused by dehydration of the proton exchange membrane. This unexpected feature allows a fuel cell system 10 to operate at higher ambient temperature conditions. As noted in the background of the invention, SOFC devices have employed porous electrically conductive ceramic materials to fabricate the anode and cathode of same. However, in the operation of SOFC devices, water cannot, nor need not be retained by the ceramic gas diffusion layers employed with same in view of the high operating temperatures) (600-900°). Additionally, and while some amount of water is necessary to render a proton exchange membrane 290 operational, no water is necessary to render the ceramic electrolyte used in a SOFC operational, rather the high temperature of operation of a SOFC renders the electrolyte ionically conductive.

Referring now to FIG. 27, in one possible form of the invention, an alternative electrically conductive gas diffusion layer 320 is provided and which may be substituted for the first and second electrically conductive ceramic gas diffusion layers 270 and 300, respectively, as earlier described. In this form of the invention, the electrically conductive gas diffusion layer 320 may comprise a plurality of sintered wire meshes of decreasing porosity which are integrally joined together in order to provide the advantages that are supplied by means of the electrically conductive and porous ceramic material which is typically utilized in the fabrication of the first and second gas diffusion layers 270 and 300, respectively. As seen in that view, the plurality of wire meshes 321 have decreasing porosity and are sintered in a conventional means thereby becoming a unitary object which may be used in combination with a proton exchange membrane 290 as earlier described. In another possible form of the invention, the electrically conductive gas diffusion layer 320 may be coated with a catalyst layer, and thereafter combined with a proton exchange membrane 290 as seen earlier with respect to FIGS. 25-26.

Referring now to FIGS. 22-27, the bonded or juxtaposed combination of proton exchange membrane 290; electrode or catalyst layers 274, 295, 296, or 305; and gas diffusion layer 270 or 300 is often referred to as a membrane electrode diffusion assembly (MEDA) 313. It can now be understood by one skilled in the art that in each of the various forms of the invention, at least one of the first or second gas diffusion layers 270 and/or 300 comprises a material or composition wherein an electrical conductivity is established between either the first or second gas diffusion layer 270 and/or 300 and a component of the fuel cell stack module 180 which is immediately adjacent to the gas diffusion layer 270 and/or 300 such that the electrical conductivity is substantially independent of the compressive force applied to each of the respective fuel cell stack modules 180. This feature of the invention allows a compressive force to be applied which is substantially less than the force normally applied to prior art devices. Stated somewhat differently, the compressive force applied by the respective fuel cell stack module 180 or by the opposite end plates is employed for purposes of sealing the respective components together; maintaining thermal contact between components; and/or providing rigidity to the product, and is not principally employed to maintain an operationally effective electrical conductivity. Additionally, it will be noted that the reduced compressive forces applied to the gas diffusion layers 270 and 300 improves the respective gas diffusion layers mass transport capabilities inasmuch as high compressive forces which are typically applied in prior art stack arrangements tend to crush porous materials thereby impeding mass transport therethrough.

Therefore, in one form of the invention, a proton exchange membrane fuel cell stack module 180 is provided and which includes a membrane electrode assembly 310 having a first, anode side 311, and a second cathode side 312, and wherein the anode and cathode sides 311 and 312 each have an active area surface 293. In this form of the invention, as seen in FIG. 5 for example, the active area of surface 293 of at least one of the anode and cathode sides 311 and 312 of the MEA 290; and/or a fuel cell component such as the first and second gas diffusion layers 270 and 300 and/or the current collecting separator plate 251 each having a region which is oriented at least partial covering relation relative to the active area surface 293 is substantially devoid of predetermined passageways for accommodating the flow of a reactant gas. This feature of the invention is quite unique in view of the earlier teachings of many prior art references provided heretofore. In particular, it should be noted that the active area surface of either the anode side 291 or cathode side 292 or the associated ceramic gas diffusion layers 270, 300 is substantially devoid of predetermined gas passageways for accommodating the flow of a reactant gas. Similarly the adjacent current conducting separator plates is devoid of predetermined gas passageways extending along its inside or outside facing surfaces.

Figure 19:
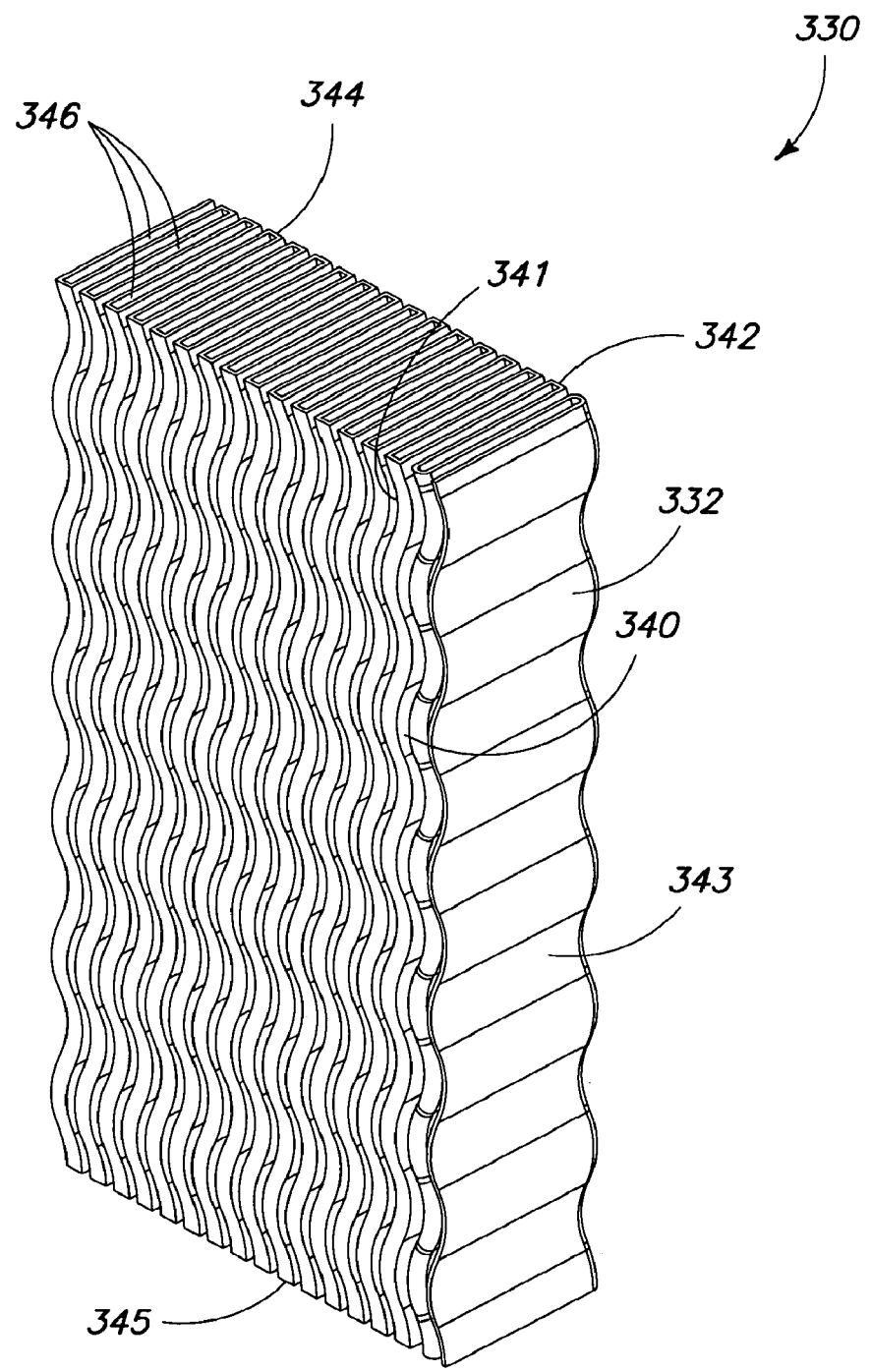
FIG. 19 is a perspective, side elevation view of a heat sink having a plurality of cooling channels, and which forms a feature of the present invention.

As best seen by references to FIG. 3 and following, the present invention further includes an electrically conductive heat sink 330 having a thermally conductive mass and which is received within the internal cavity of the frame 205, and juxtaposed in ohmic electrical contact relative to the second gas diffusion layer 300. As seen in the drawings, the heat sink 330 is oriented in fluid flowing relation relative to the air passageways 206 which are defined by the frame. In the arrangements as seen in the drawings, it will be seen that the heat sink 330 may take on various forms. For example, as seen in FIGS. 13, 14, and 15, the heat sink 330 may comprise a reticulated electrically conductive metal foam 331. An air-cooled fuel cell with a reticulated metal foam heat sink is disclosed in U.S. Pat. No. 6,939,636, the teachings of which are incorporated by reference herein. Still further, as seen in FIGS. 16 and 19, the heat sink 330 may comprise a corrugated or pleated metal heat sink 332 of various forms. In one possible form of the invention, the corrugated heat sink could be fabricated of a solid material as shown, or in the alternative, could be fabricated from a metal mesh. Further, and referring now to FIG. 17, the heat sink 330 of the present invention may comprise an extruded aluminum plate 333. Moreover, as seen in FIG. 18, the heat sink 330 may comprise a stamped, resilient, reticulated metal heat sink 334. Still further, the heat sink 330 may comprise one or more of these same forms 331-334 of the heat sink in combination. Each of the heat sinks 330, described above, includes a main body 340 which has an inwardly facing surface 341 which is juxtaposed relative to, and positioned in ohmic electrical contact thereagainst, the second electrically conductive ceramic gas diffusion layer 300. Still further, the respective heat sinks 331-334 has a second outwardly facing surface 342 which is positioned in a substantially coplanar orientation relative to the second side 202 of the respective frames 181-185, respectively. The second outwardly facing surface 342 is placed in ohmic electrical contact with the current collecting separator plate 251 of the adjacent fuel cell stack module 180, thus electrically coupling each of the fuel cell stack modules 180 within the fuel cell stack 40, 70, 90, 130, and 160. It should be understood that if two or more heat sink forms 331-334 are used in combination, then the outermost heat sink would still have an outwardly facing surface which is substantially coplanar with the outwardly facing surface 202 of the respective frames 181-185, respectively. Therefore, the respective heat sinks are enclosed within the internal cavity 205 of the respective frames 181-185. The respective heat sinks 330 further have a peripheral edge 343 and a thickness dimension which is measured between the inwardly and outwardly facing surfaces 341 and 342, respectively. In one form of the invention as seen in FIG. 14, the thickness dimension of the heat sink 33 is greater than about 10 millimeters to less than about 100 millimeters. Still further, the main body of each of the heat sinks 340 has a first end 344 and a second end 345. Each of the main bodies 340 of the respective heat sinks 330 define a plurality of air passageways 346 which allow the passage of cooling air therethrough in order to facilitate the removal of heat energy and moisture which is generated by the proton exchange membrane fuel cell stack 40, 70, 90, 130 and 160 during operation. As will be appreciated from the drawings, the plurality of air passageways 346 are oriented in fluid flowing relation relative to the air passageways 206 which are defined by the respective frames 181-185, respectively. As should be understood from a study of FIGS. 14 and 15, the thermal mass and/or the thickness of the heat sink 330 may be varied in order to achieve a substantially uniform operational temperature for each of the fuel cell modules 180.

Figure 20:
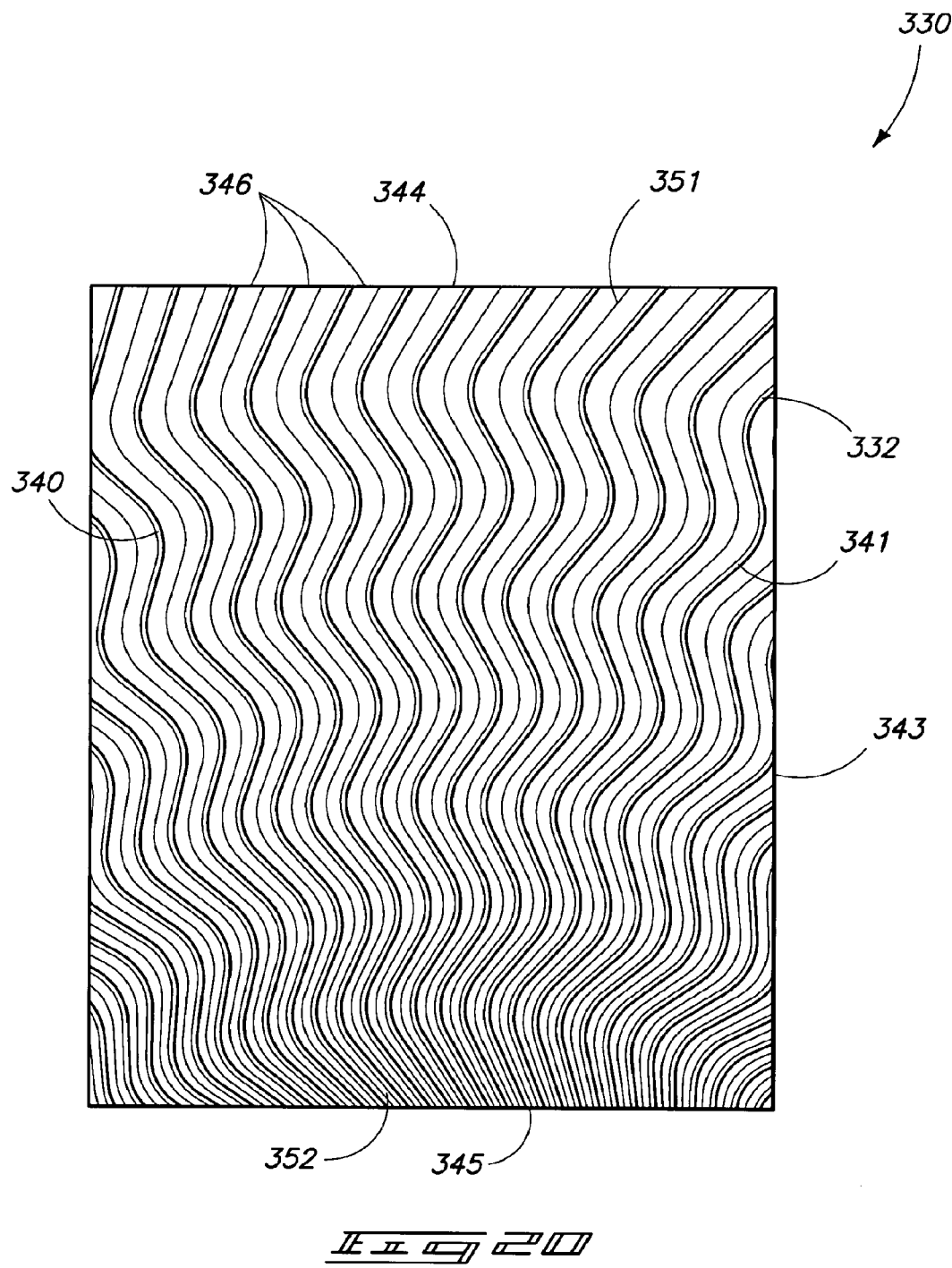
FIG. 20 is a side elevation view of the heat sink as illustrated in FIG. 19, but with variably sized cooling channels which forms a feature of the present invention.

In the arrangement as seen in the drawings, it should be understood that each of the fuel cell stack modules 180 have an operating temperature which is within less than about 10% of any other fuel stack modules 180 which are located within the same fuel cell stack 40, 70, 90, 130 and 160. Further, in the arrangement as shown in the drawings, it should be understood that the thermally conductive mass of the individual heat sinks 330 of each of the fuel cell stack modules 180 provides a substantially different degree of cooling for each of the respective fuel cell stacks module 180 within the fuel cell stack 40, 70, 90, 130 and 160 so that the resulting operating temperature of any one of the plurality of fuel cell stack modules 180 differs from the operating temperature of any other of the plurality of fuel cell stack modules 180 by less than about 10%. In the arrangements as seen in the drawings, it should be understood that the individual modules 180 may have electrically conductive heat sinks 330 which have variable thermally conductive masses. More specifically, those modules 180 which are located increasingly inwardly towards the center portion of a proton exchange membrane fuel cell stack 40, 70, 90, 130 and 160 typically will have thermally conductive masses greater than those fuel cell stack modules 180 that are positioned closer to the end plates 41 and 42, for example. This variation in the thermally conductive mass of the respective fuel cell stack modules 180 facilitates the effective dissipation of heat energy which is a byproduct of the operation of the proton exchange membrane fuel cell stack. Moreover, another possible form of the invention as best seen in FIGS. 19 and 20, a corrugated or pleated metal heat sink 332, maybe provided with or without variations in cross-sectional dimensions of the air passageways along the length of the heat sink. The pleated metal heat sink 332 is formed from an electrically conductive substrate which defines a plurality of passageways 346 which have various cross-sectional dimensions when these passageways are measured between the first and second ends 344 and 345 thereof. As seen in the form of the heat sink shown in FIG. 20, it will be noted that the plurality of air passageways 346 which originate at the first end 344 have, generally speaking, a wider cross-sectional dimension than the same air passageways 346 which are located at the opposite second end 345. This variation in the cross-sectional dimensions of the plurality of passageways provides at least first and second air cooling velocities 351 and 352 relative to the respective passageways 346. It should be understood that these first and second cooling air velocities each provide substantially different degrees of cooling relative to the heat sink 330 along its length as measured between the first and second ends 344 and 345, respectively. Therefore, the heat sinks 330 of the present invention provide a means not only for maintaining a substantially constant operating temperature of less than about 10% between the individual fuel cell stack modules 180 within any fuel cell stack 40, 70, 90, 130 and 160, but further provides a means for substantially cooling each module in a substantially uniform way to provide optimum operational efficiency for each of the respective fuel cell modules 180 regardless of the location of the fuel cell stack modules 180 within a proton exchange membrane fuel cell stack 10.

Furthermore, and referring now to FIG. 21 and as earlier discussed, the same proton exchange membrane fuel cell stack arrangement 160 further provides that the air passageways 206 as defined by the respective frames 181 may have variable cross-sectional areas. Therefore, it should be appreciated that the present invention provides not only a means for varying the thermally conductive mass of each of the respective electrically conductive heat sinks 330 as well as providing variable amounts of air by means of varying the numbers and cross-sectional dimensions of the air passageways 206 in order to provide an operatively effective and substantially uniform operational temperature for the proton exchange membrane fuel cell stack 40, 70, 90, 130 and 160, respectively.

OPERATION

The operation of the described embodiment of the present invention is believed to be readily apparent and is briefly summarized at this point.

In one of its broadest aspects, the present invention relates to a proton exchange membrane fuel cell stack 40, 70, 90, 130 and 160 which includes a plurality of repeating, serially electrically coupled fuel cell stack modules 180, which are sealably mounted together by a compressive force of less than about 60 pounds per square inch. In the arrangement as seen in the drawings, the fuel cell stack modules 180 each have an operating temperature which is within less than about 10% of any other of the fuel cell stack modules 180 which are located within the same proton exchange membrane fuel cell stack. This compressive force applies a proton exchange membrane sealing force to the mounting flange 210 which lies in a range of about 5 pounds PSI to about 50 pounds PSI. In the arrangement as seen in the various drawings, the proton exchange membrane fuel cell stack 40, 70, 90, 130 and 160 has an operationally effective conductivity as measured between the first and second end plates 41, 42; 71, 72; 91, 92; 131, 132; 161 and 162, and which is achieved at a pressure less than the compressive force applied by the first and second end plates. This is indeed unique relative to prior fuel cell stacks disclosed heretofore and wherein substantial compressive force was applied by the end plates of these prior art devices in order to facilitate an appropriate operationally effective conductivity and further to achieve appropriate sealing of the individual proton exchange membrane fuel cell components positioned therebetween. Additionally, these prior art devices suffer from problems associated with undue heat accumulation in various portions of PEM stack and variability in their operationally effective conductivity in view of inappropriate hydration, and other problems that are well known in the art.

In the arrangement as seen in the drawings, the anode side 291 of the proton exchange membrane 290 has an active area 293. In one possible form of the invention, the active area 293 of the proton exchange membrane 290; or the current collecting separator plate 251 which is positioned in at least partial covering relation relative thereto are both substantially devoid of predetermined passageways for accommodating the flow of a reactant gas 30. This is indeed unique and novel relative to previous proton exchange membrane fuel cell stacks where rather elaborate predetermined passageways have been utilized, heretofore, to manage the flow of reactant gas and to optimize the performance of these prior art devices.

Another aspect of the present invention relates to a proton exchange membrane fuel cell stack 40, 70, 90, 130 and 160 which includes first and second endplates 41, 42; 71, 72; 91, 92; 131, 132; 161 and 162, which are disposed in substantially parallel spaced relation one relative to the other; and a plurality of repeating, air-cooled, fuel cell stack modules 180 are positioned between the first and second endplates, and which are serially electrically coupled together, and wherein the respective endplates sealably couple the respective fuel cell stack modules 180 together by applying, at least in part, a compressive force of less than about 60 pounds per square inch to each of the respective fuel cell stack modules 180, and wherein the proton exchange membrane fuel cell stack has an operational temperature profile as measured between the first and second end plates which varies by less than about 10%. As noted earlier, the proton exchange membrane fuel cell stack has an operationally effective conductivity, as measured between the first and second endplates which is achieved at a pressure which is less than the compressive force which is experienced by the respective proton exchange modules 180.

Another aspect of the present invention relates to a proton exchange membrane fuel cell stack module 180 which includes a proton exchange membrane 290 having an anode side 291, and a cathode side 292; a first gas diffusion layer 270 juxtaposed relative to the anode side 291; a second gas diffusion layer 300 juxtaposed relative to the cathode side 292; an electrically conductive heat sink 330 having a thermally conductive mass juxtaposed relative to the second gas diffusion layer 300; and a current collecting separator plate 251 juxtaposed in ohmic electrical contact relative to the first gas diffusion layer 270. In the arrangement as seen in the various drawings, the plurality of fuel cell stack modules 180 are electrically connected in series, and are further mounted between a first and second endplates 41, 42; 71, 72; 91, 92; 131, 132; 161 and 162 to form a fuel cell stack 40, 70, 90, 130 and 160. In the drawings, the current collecting separator plate 251 of a first fuel cell module 180 is juxtaposed relative to the first endplate, and wherein the heat sink 330 of a remote, second fuel cell module 180 is positioned in force receiving relation relative to the second endplate. The first and second endplates provide a compressive force of less than about 60 pounds per square inch to each of the plurality of proton exchange membrane fuel cell stack modules.

Still another aspect of the present invention relates to a proton exchange membrane fuel cell stack 40, 70, 90, 130 and 160 which includes a plurality of repeating, serially electrically coupled fuel cell stack modules 180, and which are sealably mounted together by a compressive force of less than about 60 pounds per square inch, and wherein the respective fuel cell stack modules 180 further comprise a frame 181-185 having an inside and an outside peripheral edge 204, 203, respectively, and first and second sides 201 and 202, respectively. The inside peripheral edge 204 defines an internal cavity 205, and wherein the respective frames 181-185 are self-aligning and matingly nest together in an operational orientation. The respective frames 181-185 each define an air passageway 206 which extends between the inside and outside peripheral edges and which communicates with the internal cavity thereof.

In still another aspect of the present invention a proton exchange membrane fuel cell stack module 180 is provided and which further includes a proton exchange membrane 290 having an anode side 291, and a cathode side 292; and a first gas diffusion layer 270 juxtaposed relative to the anode side 291. In this arrangement, a second gas diffusion layer 300 is provided and which is juxtaposed relative to the cathode side 292. Still further, an electrically conductive heat sink 330 is juxtaposed relative to the second gas diffusion layer 300. Yet further, a frame 181-185 having an inside and an outside peripheral edge 204 and 203, respectively, and first and second sides 201 and 202 are provided. In this arrangement, the inside peripheral edge 204 defines an internal cavity 205 therewithin the individual frames 181-185, respectively. Still further, the proton exchange membrane 290, the first and second gas diffusion layers 270 and 300, respectively, and the heat sink 330 are enclosed within the internal cavity 205. Still further, a first current collecting separator plate 251 is mounted on the first side 201 of the respective frames 181-185, respectively. The current collecting separator plate 251 is juxtaposed relative to the first gas diffusion layer 270, so as to form a fuel cell stack module 180. In the arrangement as seen in the drawings, a plurality of fuel cell stack modules 180 are positioned between a first and a second endplate 41, 42; 71, 72; 91, 92; 131, 132; 161 and 162, and are further serially electrically coupled together, and wherein the respective endplates apply a compressive force of less than about 60 pounds per square inch on each of the respective fuel cell stack modules 180. In the arrangement as seen in the various drawings, the first and second gas diffusion layers 270 and 300, respectively comprise, at least in part, a porous electrically conductive ceramic material layer. This ceramic material layer is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof.

Another aspect of the present invention relates to a proton exchange membrane fuel cell stack 40, 70, 90, 130 and 160, and which includes a plurality of repeating serially electrically coupled fuel cell stack modules 180, each defining an internal cavity 205, and which are further sealably mounted together by a compressive force of less than about 60 pounds per square inch. Still further, a proton exchange membrane 290 is provided ad which is placed in an operational orientation relative to at leasfone ceramic gas diffusion layer 270 or 300 and which is further received within the cavity 205 of the respective fuel cell stack modules 180.

In still another aspect of the present invention a proton exchange membrane fuel cell stack 40, 70, 90, 130 and 160 includes first and second endplates 41, 42; 71, 72; 91, 92; 131, 132; 161 and 162, which are disposed in substantially parallel spaced relation; and a plurality of repeating, air-cooled, fuel cell stack modules 180 are positioned between the first and second endplates, and which are serially electrically coupled together, and which further has an operationally effective conductivity, as measured between the first and second endplates, and which is achieved at a pressure less than a compressive force applied to each of the plurality of the fuel cell stack modules 180, and which further has an operationally effective temperature profile as measured between the first and second end plates which is substantially uniform.

In still another aspect of the present invention includes a proton exchange membrane fuel cell stack module 180. The module 180 encloses a proton exchange membrane 290 having an anode side 291 and a cathode side 292; and a first electrically conductive ceramic layer 270 is juxtaposed relative to the anode side. In this form of the invention a second electrically conductive ceramic layer 300 is provided and which is juxtaposed relative to the cathode side; and an electrically conductive heat sink 330 is juxtaposed relative to the second electrically conductive ceramic layer. In this form of the invention, a frame 181-185 is provided and which has an inside and an outside peripheral edge 204 and 203, respectively. Still further, the frames 181-185 have first and second sides 201 and 202, and wherein the inside peripheral edge 204 defines an internal cavity 205. In this form of the invention, the respective frames 181-185 each define an air passageway 206 which extends between the inside and outside peripheral edges 204 and 203, respectively and which communicates with internal cavity 205 thereof. The proton exchange membrane 290, first and second electrically conductive ceramic layers 270 and 300, respectively, and the electrically conductive heat sink 330 are each substantially enclosed within the internal cavity 205. Still further, in this form of the invention, a current collecting separator plate 251 is mounted on the first side 201 of the frames 181-185, and which is juxtaposed relative to the first electrically conductive ceramic layer 270.

In still another aspect of the present invention a proton exchange membrane fuel cell stack 40, 70, 90, 130 and 160 is provided and which includes a plurality of proton exchange membrane 290 each having an anode side 291, and a cathode side 292; and a first porous, electrically conductive ceramic layer 270 juxtaposed relative to the anode side 291 of each of the proton exchange membranes 290. Still further, in this form of the invention, a second porous, electrically conductive ceramic layer 300 is juxtaposed relative to the cathode side 292 of each of the proton exchange membranes 290, and wherein the proton exchange membrane fuel cell stack has an operational temperature which is less than about 200 degrees C.

In still another form of the invention, a proton exchange membrane fuel cell stack module 180 is provided and which includes a proton exchange membrane 290 having an anode side 291, and a cathode side 292, and wherein the anode and cathode sides 291 and 292 each have an active area surface 293. In one form of the invention, the active area surface 293 of at least one of the anode side, or the cathode side 291 and 292 of the proton exchange membrane 290, and/or a fuel cell component such as the first or second ceramic gas diffusion layers 270 or 300, respectively, and/or the current collecting separator plate 251 have a region which is oriented at least in partial covering relation relative thereto, and which is substantially devoid of predetermined passageways for accommodating the flow of a reactant gas 30.

In each of the forms of the invention as provided, the proton exchange membrane fuel cell modules 70 each include an electrically conductive heat sink 330 having an inside and an outside facing surface 341 and 342, respectively, and which is received in the internal cavity 205 of each of the frames 181-185, respectively, and wherein the inside facing surface 341 is juxtaposed relative to the second gas diffusion layer 300 and the outside facing surface 342 of the heat sink 330 is oriented in a substantially coplanar orientation relative to the second side 202 of each of the frames 181-185, respectively. Still further, the heat sink is oriented in fluid flowing relation relative to the air passageway 206 which is defined by the respective frames 181-185, respectively. Still further, the heat sink 330 has a thickness dimension which is greater than about 10 mm. and a thermally conductive mass which may be varied between the individual proton exchange membrane fuel cell stack modules 180 so as to provide an operationally uniform temperature as measured between the first and second end plates 41, 42; 71, 72; 91, 92; 131, 132; 161 and 162, respectively.

Therefore, it will be seen that a proton exchange membrane fuel cell stack power system 10 is described and which provides assorted advantages over conventional proton exchange membrane fuel cell stacks which have been utilized heretofore. The present invention is air cooled, easy to manufacture, and assemble, and achieves an operationally effective conductivity at pressures less than the amount of pressure necessary to seal the individual proton exchange membrane modules 180 together, and further provides a convenient means for generating electrical power in a cost effective manner and which has not been possible, heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:
1. A proton exchange membrane fuel cell stack, comprising:
   multiple serially arranged proton exchange membrane fuel cell modules;
   an individual proton exchange membrane fuel cell module including:

a frame having an inside and an outside peripheral edge, and first and second sides, and wherein the inside peripheral edge defines an internal cavity relative to the second side;

a current collecting separator plate mounted on the first side of the frame;

a proton exchange membrane having an anode side and a cathode side;

a first electrically conductive porous layer juxtaposed relative to the anode side;

a second electrically conductive porous layer juxtaposed relative to the cathode side;

an electrically conductive heat sink juxtaposed relative to the second electrically conductive porous layer;

wherein the frame defines an air passageway which extends between the inside and outside peripheral edges and which communicates with the internal cavity thereof, and wherein the proton exchange membrane, the first and second electrically conductive porous layers, and the electrically conductive heat sink are enclosed within the internal cavity effective that both the second surface of the frame and the electrically conductive heat sink contact a current collecting separator plate of a frame of an adjacent proton exchange membrane fuel cell module.

* * * * *